(12) United States Patent
Koch et al.

(10) Patent No.: US 12,144,276 B2
(45) Date of Patent: Nov. 19, 2024

(54) ROW CLOSING ASSEMBLIES

(71) Applicant: Precision Planting LLC, Tremont, IL (US)

(72) Inventors: Dale M. Koch, Tremont, IL (US); Jeremy J. Hodel, Morton, IL (US); Timothy Kater, Bloomington, IL (US); Douglas William Urbaniak, Mackinaw, IL (US)

(73) Assignee: Precision Planting LLC, Tremont, IL (US)

( * ) Notice: Subject to any disclaimer, the term of this patent is extended or adjusted under 35 U.S.C. 154(b) by 175 days.

(21) Appl. No.: 17/658,403

(22) Filed: Apr. 7, 2022

(65) Prior Publication Data

US 2022/0279701 A1 Sep. 8, 2022

Related U.S. Application Data

(60) Continuation of application No. 17/096,536, filed on Nov. 12, 2020, which is a division of application No.
(Continued)

(51) Int. Cl.
*A01B 76/00* (2006.01)
*A01B 49/02* (2006.01)
(Continued)

(52) U.S. Cl.
CPC ............ *A01B 76/00* (2013.01); *A01B 49/027* (2013.01); *A01B 49/06* (2013.01); *A01B 63/32* (2013.01);
(Continued)

(58) Field of Classification Search
CPC ....... A01B 49/06; A01B 63/32; A01B 79/005; A01B 49/04; A01B 49/00; A01B 63/24; A01B 63/14; A01B 63/00; A01B 79/00; A01B 76/00; A01B 49/027; A01B 49/02; A01C 5/064; A01C 5/066; A01C 5/068; A01C 7/042; A01C 7/203; A01C 7/205;
(Continued)

(56) References Cited

U.S. PATENT DOCUMENTS 2,076,347 A * 4/1937 Moore .................. G01B 5/255
33/203.17
2,664,644 A * 1/1954 Tyerman ................ G01B 5/255
33/203.2
(Continued)

FOREIGN PATENT DOCUMENTS

CN 101080968 A 12/2007
CN 0614628201072894 Y 6/2008
(Continued)

*Primary Examiner* — Christopher J. Novosad

(57) ABSTRACT

A row planting unit closing system including a first stage closing unit adapted to be attached to a row planting unit and including: a first stage frame; and a set of at least one row closing wheel having a closing angle orientation non-perpendicular relative to the ground; and wherein the first stage frame is attached at a first end to the row planting unit, the first stage frame comprising a linkage mechanism for setting a toe in angle orientation of the set of at least one row closing wheel relative to the first stage frame.

11 Claims, 21 Drawing Sheets

Related U.S. Application Data

16/190,089, filed on Nov. 13, 2018, now Pat. No. 10,932,405, which is a continuation of application No. PCT/US2017/032426, filed on May 12, 2017.

(60) Provisional application No. 62/465,134, filed on Feb. 28, 2017, provisional application No. 62/425,978, filed on Nov. 23, 2016, provisional application No. 62/336,069, filed on May 13, 2016.

(51) Int. Cl.
| | |
|---|---|
| *A01B 49/06* | (2006.01) |
| *A01B 63/32* | (2006.01) |
| *A01B 79/00* | (2006.01) |
| *A01C 5/06* | (2006.01) |
| *A01C 7/04* | (2006.01) |
| *A01C 7/20* | (2006.01) |
| *G01B 7/26* | (2006.01) |
| *G01B 15/00* | (2006.01) |

(52) U.S. Cl.
CPC ............ *A01B 79/005* (2013.01); *A01C 5/064* (2013.01); *A01C 5/066* (2013.01); *A01C 5/068* (2013.01); *A01C 7/042* (2013.01); *A01C 7/203* (2013.01); *A01C 7/205* (2013.01); *G01B 7/26* (2013.01); *G01B 15/00* (2013.01)

(58) Field of Classification Search
CPC .. A01C 5/062; A01C 5/06; A01C 5/00; A01C 7/04; A01C 7/00; A01C 7/201; A01C 7/20; G01B 7/26; G01B 15/00; G01B 7/00

See application file for complete search history.

(56) References Cited

U.S. PATENT DOCUMENTS

| | | | |
|---|---|---|---|
| 3,878,901 A | 4/1975 | Robertson, Sr. et al. | |
| 4,413,685 A | 11/1983 | Gremelspacher et al. | |
| 4,775,940 A | 10/1988 | Nishida et al. | |
| 5,060,205 A | 10/1991 | Phelan | |
| 6,216,795 B1 | 4/2001 | Buchl | |
| 7,975,629 B1 | 7/2011 | Martin et al. | |
| 8,561,472 B2 | 10/2013 | Planting | |
| 8,909,436 B2 | 12/2014 | Achen et al. | |
| 9,408,337 B2 | 8/2016 | Sauder et al. | |
| 9,609,802 B2 | 4/2017 | Needham et al. | |
| 10,251,337 B2 | 4/2019 | Conrad et al. | |
| 10,874,042 B2 * | 12/2020 | Strnad | A01B 63/32 |
| 10,932,405 B2 * | 3/2021 | Koch | A01C 5/068 |
| 11,547,036 B2 * | 1/2023 | Strnad | A01B 79/005 |
| 11,785,876 B2 * | 10/2023 | Strnad | G01B 7/26 |
| | | | 172/184 |
| 11,812,682 B2 * | 11/2023 | Strnad | A01C 7/205 |
| 11,839,171 B2 * | 12/2023 | Strnad | G01B 7/26 |
| 11,839,172 B2 * | 12/2023 | Koch | A01C 5/064 |
| 2013/0333599 A1 | 12/2013 | Bassett et al. | |
| 2014/0034344 A1 | 2/2014 | Bassett | |
| 2014/0090585 A1 | 4/2014 | Sauder et al. | |
| 2015/0289438 A1 | 10/2015 | Sauder et al. | |
| 2016/0037709 A1 | 2/2016 | Sauder et al. | |
| 2016/0150714 A1 | 6/2016 | Unruh | |
| 2016/0374258 A1 | 12/2016 | Schaffert | |
| 2019/0297774 A1 | 10/2019 | Hamilton | |
| 2020/0077569 A1 | 3/2020 | Sivinski | |
| 2020/0107486 A1 | 4/2020 | Martin et al. | |
| 2020/0214192 A1 | 7/2020 | Martin et al. | |
| 2020/0337217 A1 | 10/2020 | Hodel et al. | |
| 2021/0100157 A1 | 4/2021 | Hunt et al. | |
| 2021/0100158 A1 | 4/2021 | Martin et al. | |
| 2021/0204466 A1 | 7/2021 | Barker et al. | |

FOREIGN PATENT DOCUMENTS

| | | | | |
|---|---|---|---|---|
| DE | 102004011302 A1 | | 9/2005 | |
| JP | 2069104 A2 | | 3/1990 | |
| JP | 04360604 A2 | | 12/1992 | |
| JP | 0614628 | | 1/1994 | |
| JP | 08168301 A2 | | 7/1996 | |
| JP | 2001299010 A2 | | 10/2001 | |
| JP | 2006345805 A2 | | 12/2006 | |
| KR | 20080093260 | * | 10/2008 | ........... B60G 17/015 |
| WO | 2012/102667 A1 | | 8/2012 | |
| WO | 2014/066650 A1 | | 5/2014 | |
| WO | 2014/186810 A1 | | 11/2014 | |
| WO | 2015/169323 A1 | | 11/2015 | |
| WO | 2015/171908 A1 | | 11/2015 | |
| WO | 2016182906 A1 | | 11/2016 | |
| WO | 2018/018050 A1 | | 1/2018 | |

* cited by examiner

ROW CLOSING ASSEMBLIES

CROSS-REFERENCE TO RELATED APPLICATIONS

This application is a continuation of application Ser. No. 17/096,536, filed 12 Nov. 2020, which is a divisional application of application Ser. No. 16/190,089, filed 13 Nov. 2018, now U.S. Pat. No. 10,932,405, which is a continuation of Application No. PCT/US2017/032426, filed 12 May 2017, which claims priority to Application Nos. 62/336,069, filed 13 May 2016, 62/425,978, filed 23 Nov. 2016, and 62/465,134, filed 28 Feb. 2017, all of which are incorporated herein by reference.

BACKGROUND

It is well known that good seed-to-soil contact within the seed trench is a critical factor in uniform seed emergence and high yields. While conducting spot checks of the seed trench may help to provide some assurances that these critical factors are being achieved, such spot checks will only identify the conditions at the specific location being checked. Accordingly, there is a need for a system that will verify that good seed-to-soil contact is being achieved during planting operations and to enable automatic or remote adjustment of the planter while on-the-go.

DESCRIPTION

Figure 1:
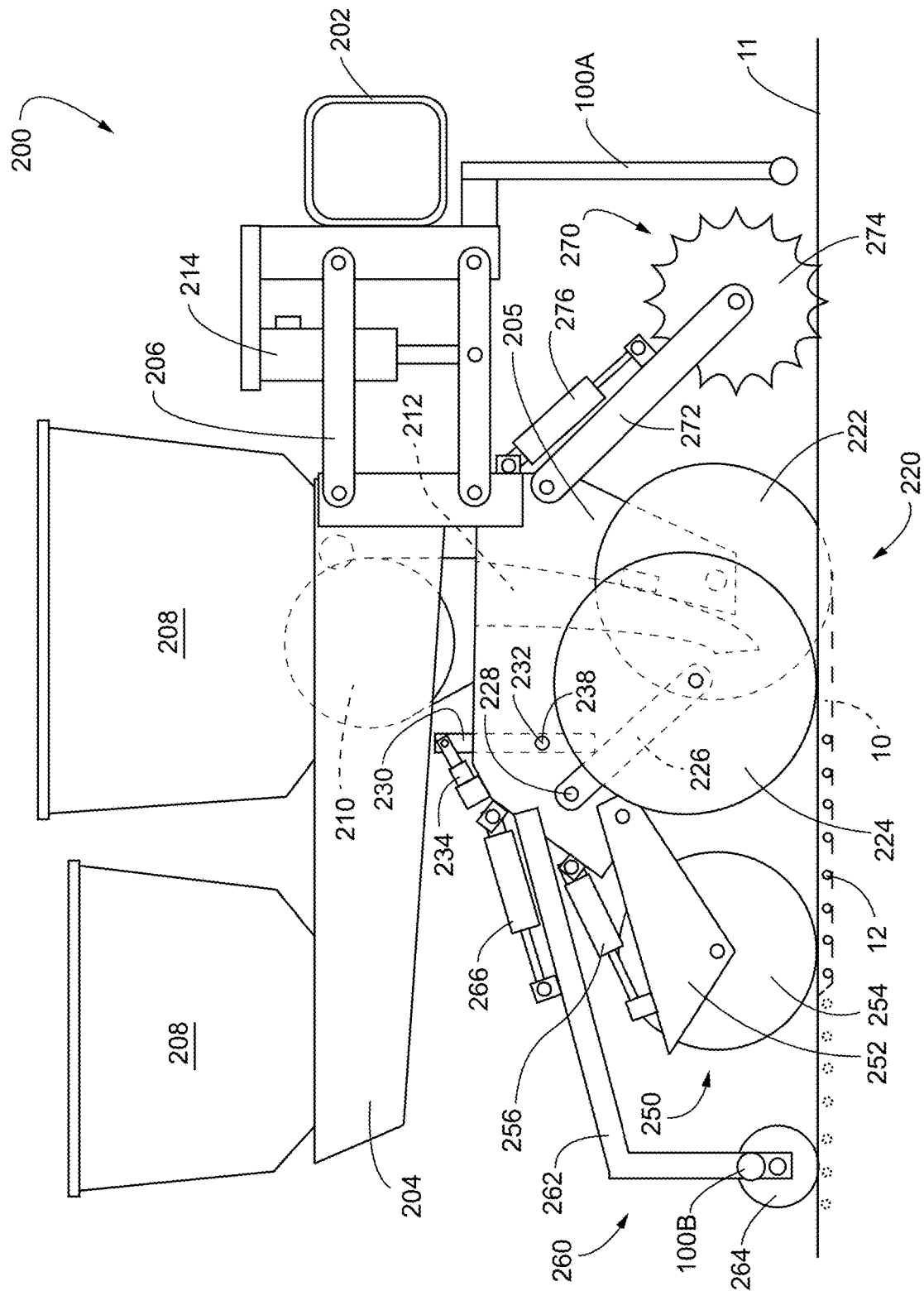
FIG. 1 is a side elevation view of an embodiment of a row unit of an agricultural planter.

Referring now to the drawings, wherein like reference numerals designate identical or corresponding parts throughout the several views, FIG. 1 illustrates an embodiment of an agricultural planter row unit 200. The row unit 200 is comprised of a frame 204 pivotally connected to a toolbar 202 by a parallel linkage 206 enabling each row unit 200 to move vertically independently of the toolbar 202. The frame 204 operably supports one or more hoppers 208, a seed meter 210, a seed delivery mechanism 212, a downforce control system 214, a seed trench opening assembly 220, a trench closing assembly 250, a packer wheel assembly 260, and a row cleaner assembly 270. It should be understood that the row unit 200 shown in FIG. 7 may be for a conventional planter or the row unit 200 may be a central fill planter, in which case the hoppers 208 may be replaced with one or more mini-hoppers and the frame 204 modified accordingly as would be recognized by those of skill in the art.

The downforce control system 214 is disposed to apply lift and/or downforce on the row unit 200 such as disclosed in U.S. Publication No. US2014/0090585, which is incorporated herein in its entirety by reference.

The seed trench opening assembly 220 includes a pair of opening discs 222 rotatably supported by a downwardly extending shank member 205 of the frame 204. The opening discs 222 are arranged to diverge outwardly and rearwardly so as to open a v-shaped trench 10 in the soil 11 as the planter traverses the field. The seed delivery mechanism 212, such as a seed tube or seed conveyor, is positioned between the opening discs 222 to deliver seed from the seed meter 210 into the opened seed trench 10. The depth of the seed trench 10 is controlled by a pair of gauge wheels 224 positioned adjacent to the opening discs 222. The gauge wheels 224 are rotatably supported by gauge wheel arms 226 which are pivotally secured at one end to the frame 204 about pivot pin 228. A rocker arm 230 is pivotally supported on the frame 204 by a pivot pin 232. It should be appreciated that rotation of the rocker arm 230 about the pivot pin 232 sets the depth of the trench 10 by limiting the upward travel of the gauge wheel arms 226 (and thus the gauge wheels) relative to the opening discs 222. The rocker arm 230 may be adjustably positioned via a linear actuator 234 mounted to the row unit frame 204 and pivotally coupled to an upper end of the rocker arm 230. The linear actuator 234 may be controlled remotely or automatically actuated as disclosed, for example, in International Publication No. WO2014/186810, which is incorporated herein in its entirety by reference.

A downforce sensor 238 is configured to generate a signal related to the amount of force imposed by the gauge wheels 224 on the soil. In some embodiments the pivot pin 232 for the rocker arm 230 may comprise the downforce sensor 238, such as the instrumented pins disclosed in U.S. Pat. No. 8,561,472, which is incorporated herein in its entirety by reference.

The seed meter 210 may be any commercially available seed meter, such as the fingertype meter or vacuum seed meter, such as the VSet® meter, available from Precision Planting LLC, 23207 Townline Rd, Tremont, IL 61568.

The trench closing assembly 250 includes a closing wheel arm 252 which pivotally attaches to the row unit frame 204. A pair of offset closing wheels 254 are rotatably attached to the closing wheel arm 252 and are angularly disposed to "close" the seed trench 10 by pushing the walls of the open seed trench back together over the deposited seed 12. An actuator 256 may be pivotally attached at one end to the closing wheel arm 252 and at its other end to the row unit frame 204 to vary the down pressure exerted by the closing wheels 254 depending on soil conditions. The closing wheel assembly 250 may be of the type disclosed in International Publication No. WO2014/066650, which is incorporated herein in its entirety by reference.

The packer wheel assembly 260 comprises an arm 262 pivotally attached to the row unit fame 204 and extends rearward of the closing wheel assembly 250 and in alignment therewith. The arm 262 rotatably supports a packer wheel 264. An actuator 266 is pivotally attached at one end to the arm 262 and at its other end to the row unit frame 204 to vary the amount of downforce exerted by the packer wheel 264 to pack the soil over the seed trench 10.

The row cleaner assembly 270 may be the CleanSweep® system available from Precision Planting LLC, 23207 Townline Rd, Tremont, IL 61568. The row cleaner assembly 270 includes an arm 272 pivotally attached to the forward end of the row unit frame 204 and aligned with the trench opening assembly 220. A pair of row cleaner wheels 274 are rotatably attached to the forward end of the arm 272. An actuator 276 is pivotally attached at one end to the arm 272 and at its other end to the row unit frame 204 to adjust the downforce on the arm to vary the aggressiveness of the action of the row cleaning wheels 274 depending on the amount of crop residue and soil conditions.

Figure 8:
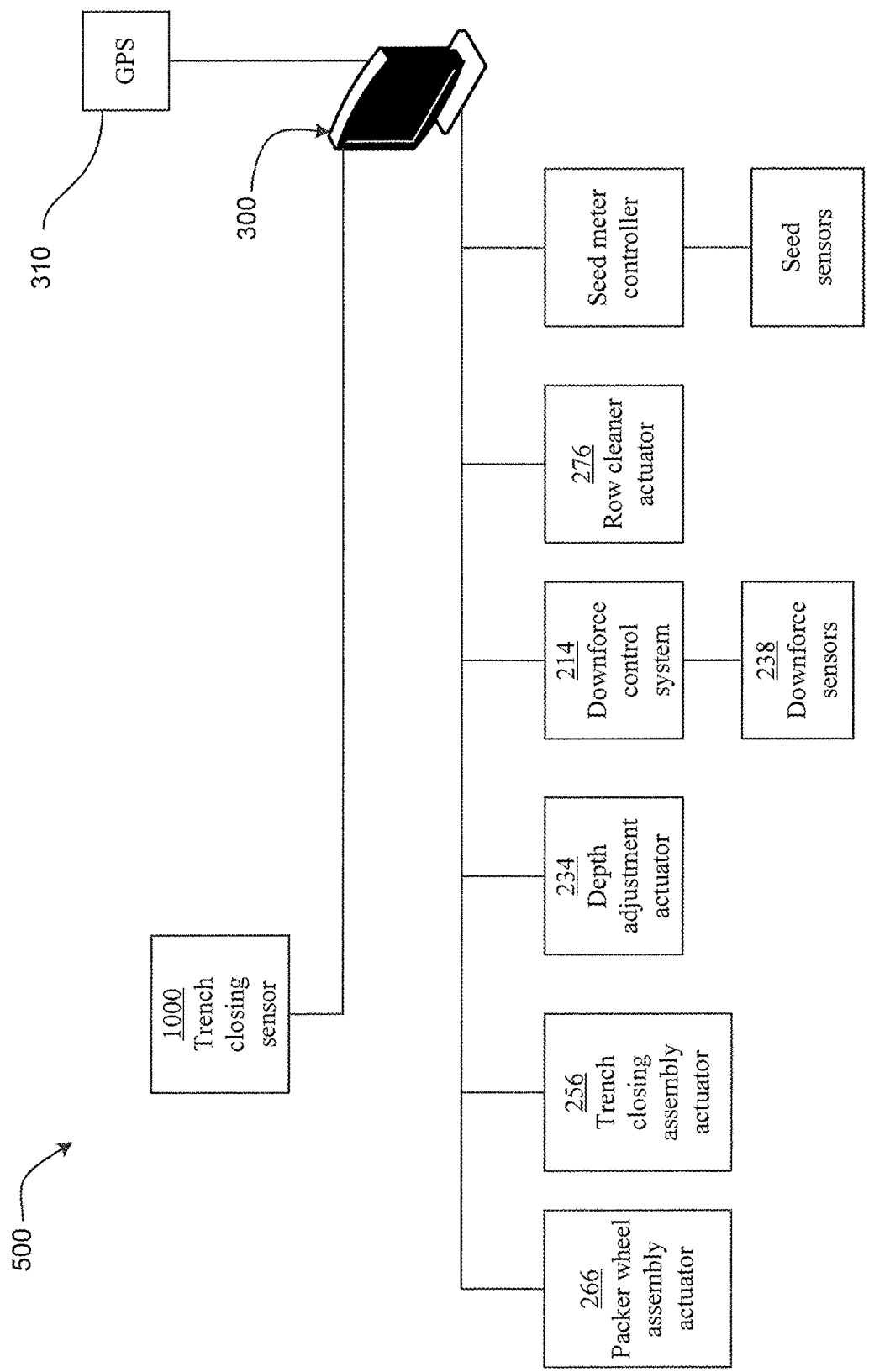
FIG. 8 is a diagram of a system for implementing operational control of the closing wheel assembly and packer wheel assembly based on signals generated by the trench closing assembly.
Figure 9:
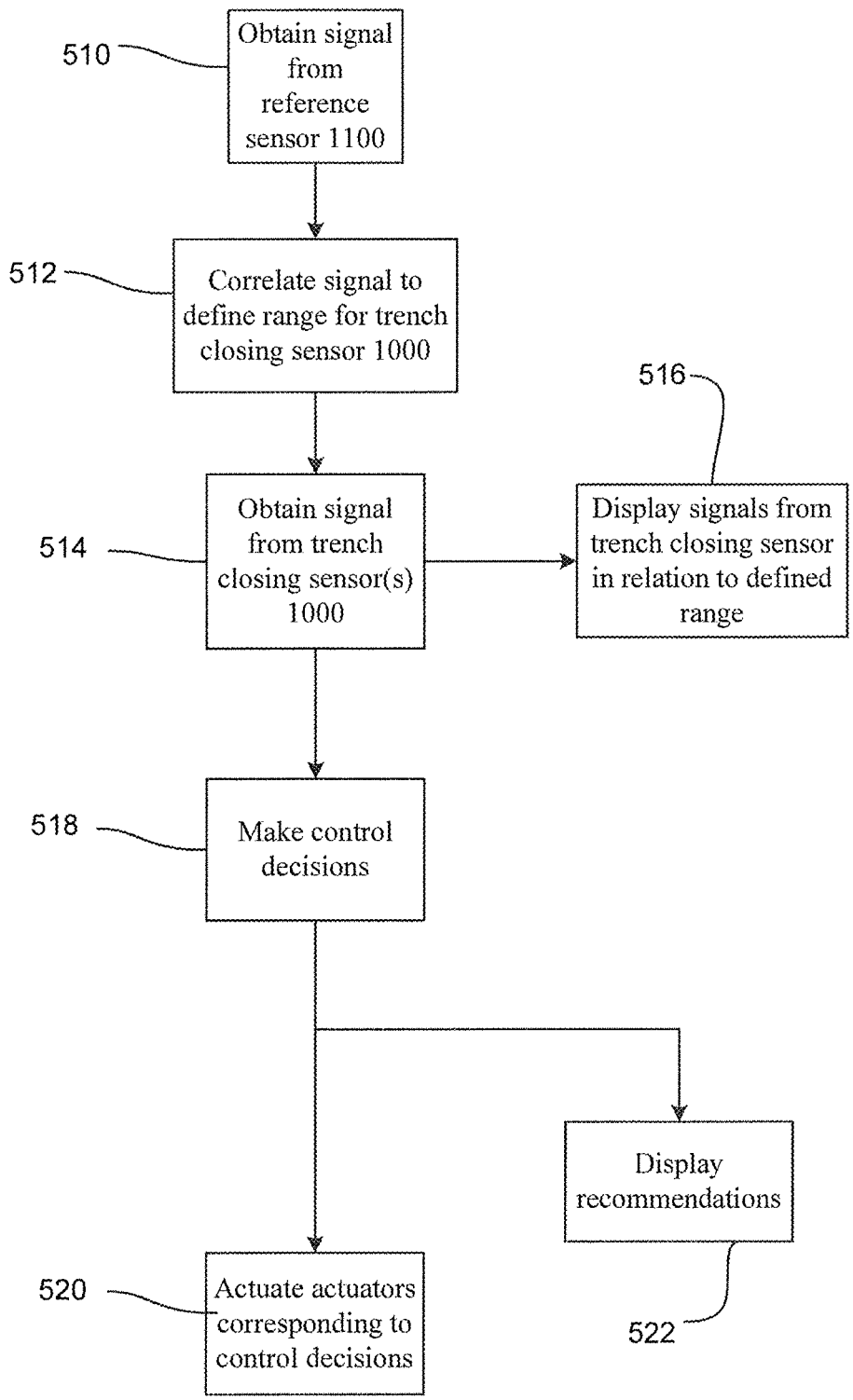
FIG. 9 is a flow chart illustrating an embodiment for implementing operational control and operator feedback based on the references sensor and trench closing sensor.

Referring to FIGS. 8 and 9, a monitor 300 is visible to an operator within the cab of a tractor pulling the planter. The monitor 300 may be in signal communication with a GPS unit 310, the trench closing assembly actuator 256 and the packer wheel assembly actuator 266 to enable operational control of the trench closing assembly 250 and the packer wheel assembly 260 (discussed later) based on the signals generated by the trench closing sensors 1000. Also as discussed later, the monitor 300 may be programmed to display operational recommendations based on the signals generated by the trench closing sensors 1000. The monitor 300 may also be in signal communication with the row cleaner actuator 276, the downforce control system 214, the depth adjustment actuator 234 to enable operational control of row cleaner assembly 270, the downforce control system 214 and the trench opening assembly 230, respectively.

Seed Trench Closing Sensors

Figure 2:
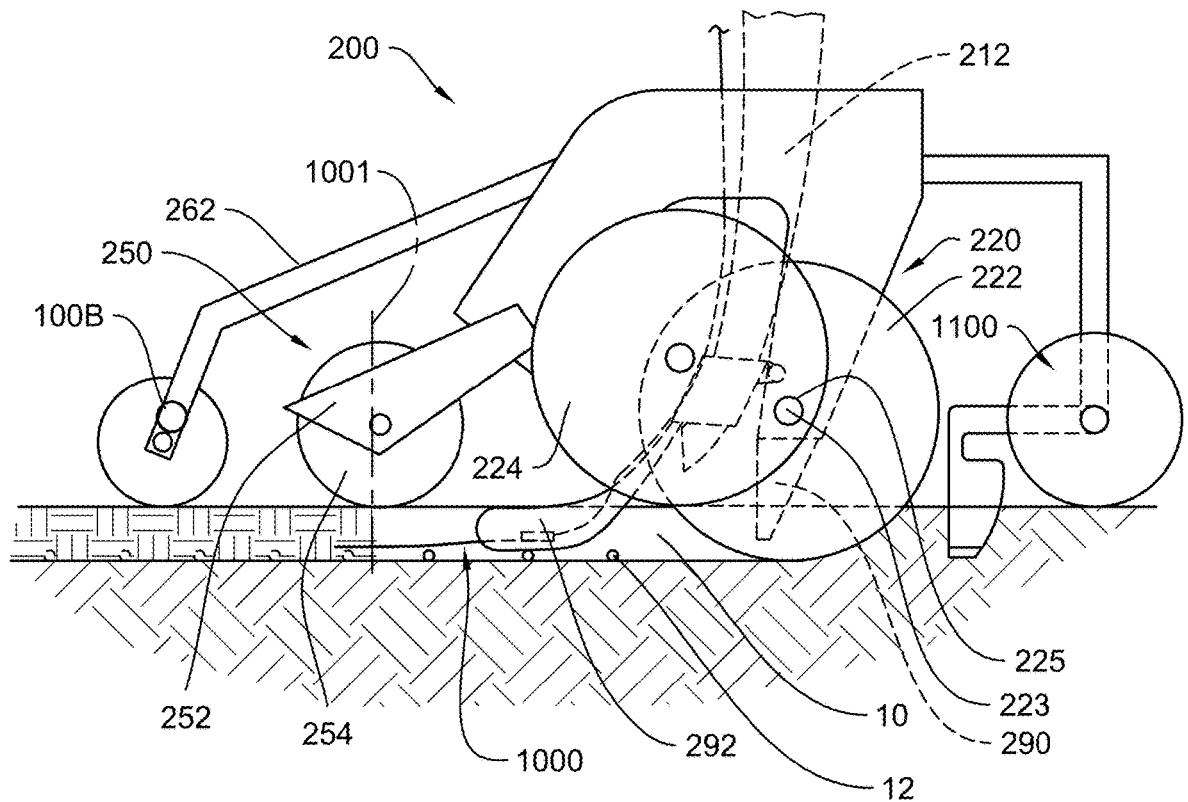
FIG. 2 illustrates an embodiment of a trench closing sensor and a reference sensor disposed on a planter row unit.

FIG. 2 illustrates a seed trench closing sensor 1000 to determine if the closing wheel assembly 250 is sufficiently closing the open seed trench 10 with soil and/or to determine the amount of compaction of the soil over the seed within the seed trench 10. The trench closing sensor 1000 comprises wire, string or other suitable elongate member (hereinafter referred to as the "drag wire" 1002) disposed to drag in the seed trench 10. Generally, as the open seed trench 10 and drag wire 1002 are covered with soil by the closing wheel assembly 250 during planting operations, the trench closing sensor 1000 measures or detects whether the seed trench is being adequately closed with soil by measuring the amount of force required to pull the wire through the soil or by measuring the amount of strain, pulling force or tension in the wire or by measuring the amount of soil pressure acting on the wire.

To adequately measure or detect if the seed trench is being adequately closed with soil, the end of the drag wire may terminate proximate to the vertical axis 1001 extending through the center of the closing wheel 254 of the closing wheel assembly 250 of the row unit 200 or several inches rearward of the vertical axis 1001.

Figure 10:
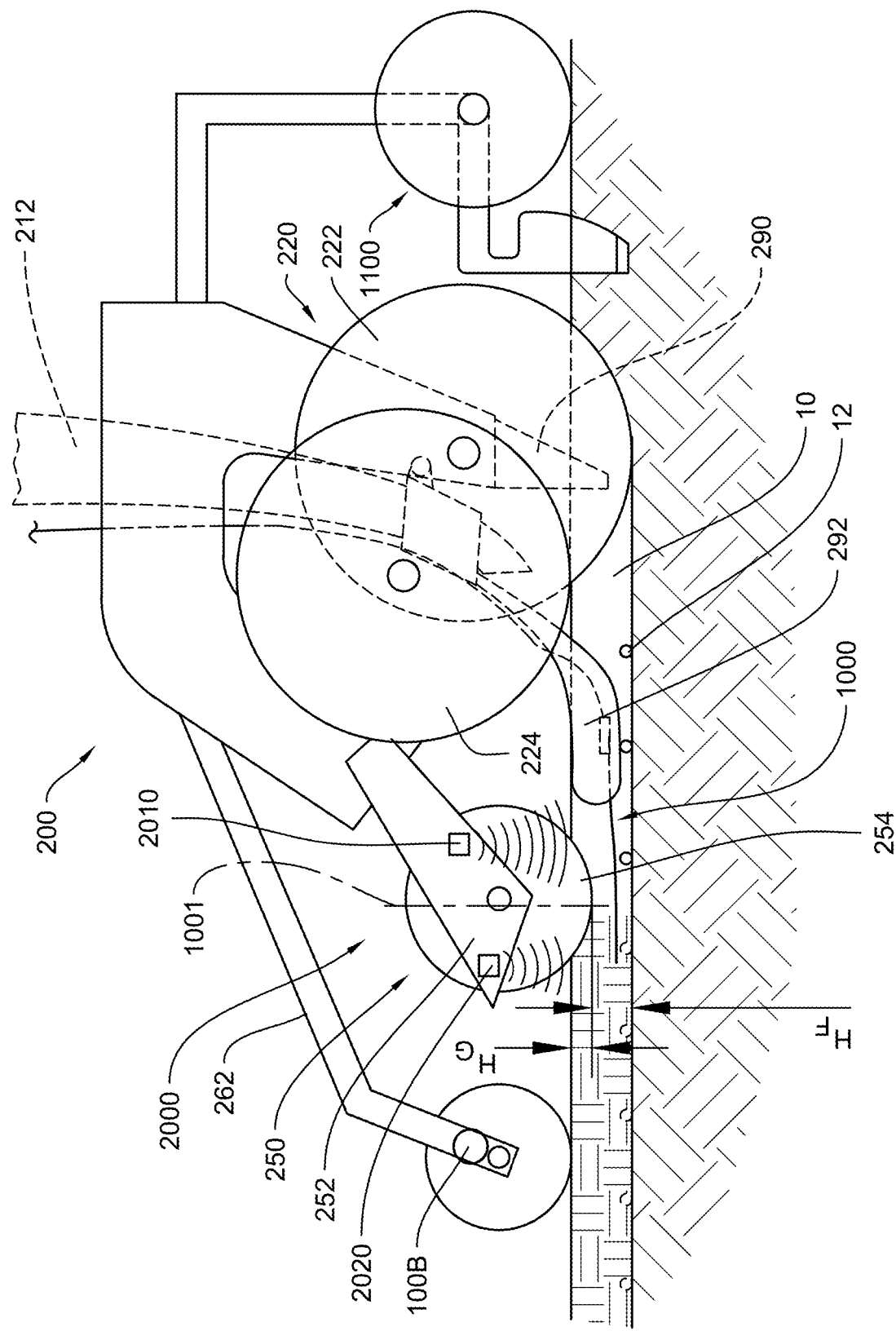
FIG. 10 illustrates an embodiment of a trench closing sensor and sensor system disposed on a closing system.

The drag wire 1002 may be supported by any suitable structure that permits the rearward end of the drag wire 1002 to drag within the seed trench 10. For example, the drag wire 1002 may be supported from the seed tube 212, the seed tube guard 290, the shank 205, or from another appurtenance 292 aligned with the seed trench. As illustrated in FIG. 10, one such appurtenance 292 may be a seed firmer, such as a Keeton® seed firmer, or a FurrowJet™, both of which are well known in the art and available from Precision Planting, LLC, 23207 Townline Rd, Tremont, IL 61568.

Figure 3:
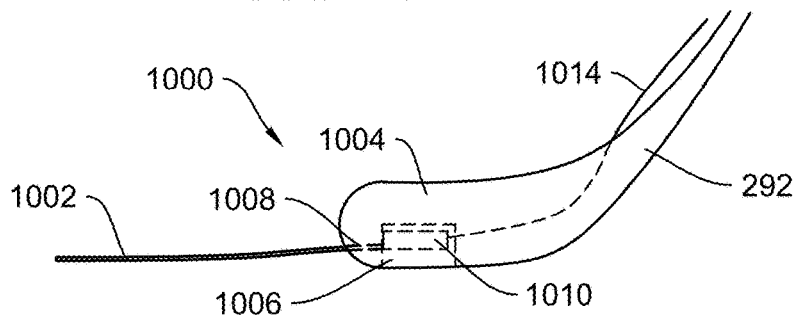
FIG. 3 is an embodiment of seed firmer adapted to function as trench closing sensor showing the drag wire coupled to an instrument disposed in the body of the seed firmer.

FIG. 3 is an embodiment of seed firmer appurtenance 292 adapted to function as trench closing sensor 1000. In this embodiment, the plastic body 1004 of the seed firmer 292 includes a cavity 1006 formed within the body. The rearward end of the drag wire 1002 extends outwardly from the rear of the body 1004 through an aperture 1008. The forwarded end of the drag wire 1002 may be coupled to an instrument 1010 (such strain gauge, a hall effect sensor or a potentiometer) disposed within the cavity 1006. The signals generated by the instrument 1010, are communicated to the monitor 300 by signal wires 1014.

Figure 23:
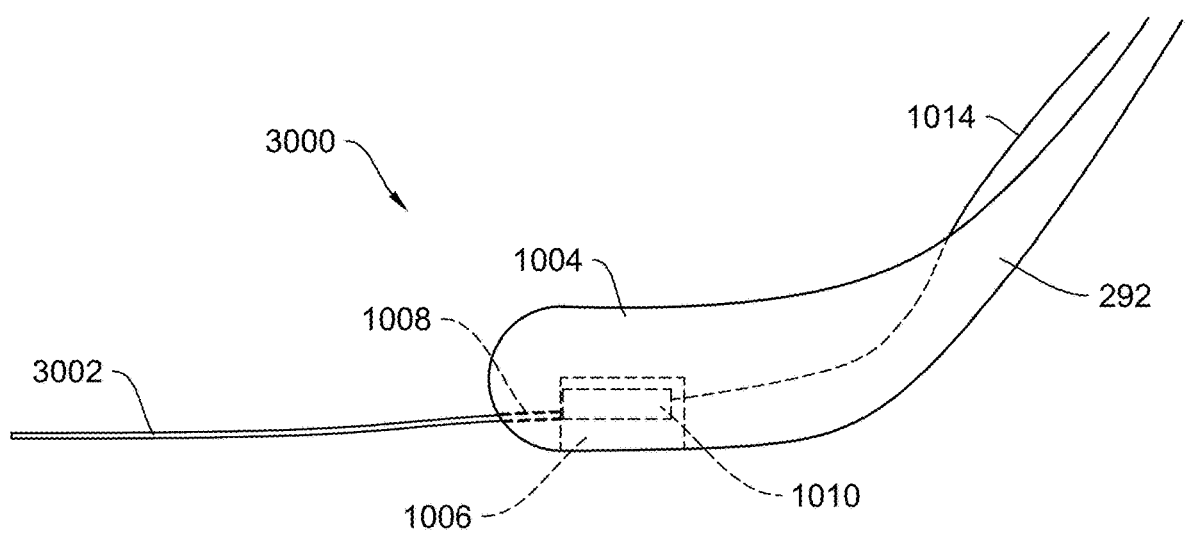
FIG. 23 is a side elevation view of an embodiment of seed firmer adapted to function as trench closing sensor showing the fluid tube coupled to an instrument disposed in the body of the seed firmer.

In an alternative embodiment, any drag wire described herein, such as drag wire 1002, can be replaced with fluid tube 9002, and instrument 1010 is a pressure sensor. FIG. 23 is a modification of FIG. 3 which shows a trench closing sensor 9000 with a fluid tube 9002. All other aspects of closing sensor 9000 may remain the same as the closing sensor 1000. In this embodiment, the fluid tube 9002 is filled with a fluid (gas or liquid) and connected to instrument 1010. As soil is added around fluid tube 9002, fluid tube 9002 compresses, and the pressure in fluid tube 9002 is increased and is measured by instrument 1010. In one embodiment, fluid tube 9002 is not elongatable fore to aft (in line with the direction of travel) so that any pressure change that would be caused by elongation is minimized or eliminated. In such an embodiment, fluid tube may have a rigid side that does not elongate. In one embodiment, at least 20% or at least 25% of the circumference/perimeter of fluid tube 9002 is rigid and the remainder is compressible. In cross-section, the fluid tube 9002 may be circular or the fluid tube 9002 may be square or polygonal in shape and may have one, two, or three rigid sides.

In use, as the row unit 200 travels forwardly, the closing wheels 254 of the trench closing assembly 250 close the open seed trench 10 by pushing the walls of the seed trench 10 back together over the deposited seed 12 and the drag wire 1002. As the drag wire 1002 is pulled through the soil of the closed seed trench, the instrument 1010 measures the strain on the drag wire 1002, or the amount of pulling force or tension exerted on the drag wire 1002. It should be appreciated that if the seed trench 10 is optimally closed producing good seed-to-soil contact, the instrument 1010 will measure a greater strain, tension or pulling force than if the seed trench is poorly closed. Likewise, the instrument 1010 can detect if the trench closing assembly 250 is excessively compacting the soil or inadequately packing the soil depending on the strain, tension or pulling force required to pull the drag wire 1002 through the closed trench.

Figure 4:
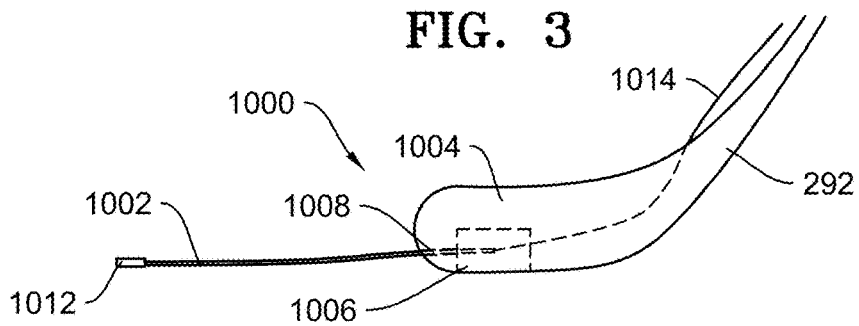
FIG. 4 illustrates an embodiment of a trench closing sensor utilizing a pressure transducer coupled to the rearward end of the drag wire.

Rather than measuring the pulling force or tension in the wire, FIG. 4 illustrates an embodiment in which a pressure transducer 1012, such as a piezoresistive or piezoelectric transducer, is coupled to the rearward end of the drag wire 1002 to measure the pressure being exerted on the transducer 1012 by the surrounding soil pushed into the seed trench 10 by the closing wheel assembly 250. The pressure detected by the transducer 1012 is communicated by signal wires 1014 to the monitor 300. It should be appreciated that the more soil pushed into the seed trench 10 by the closing wheel assembly 250, the more soil covers the transducer 1012 generating a higher pressure measurement. Conversely, if the closing wheel assembly is not pushing a sufficient amount of soil into the seed trench to adequately cover the seed, the transducer 1012 will measure a lower pressure.

Figure 5:
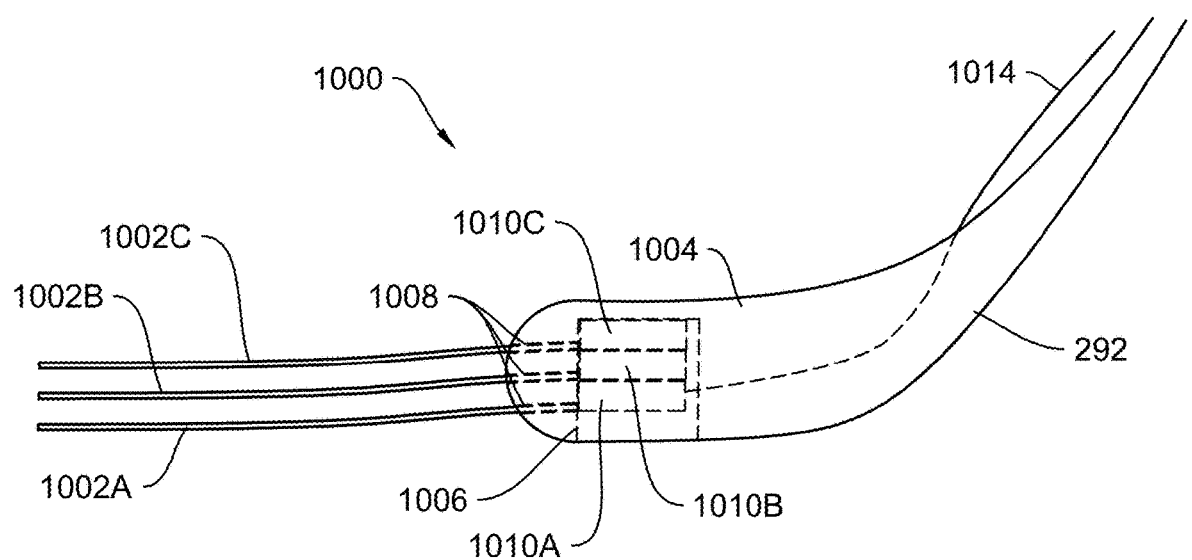
FIG. 5 illustrates an embodiment of a trench closing sensor with vertically stacked drag wires.

FIG. 5 illustrates another embodiment in which multiple drag wires 1002A, 1002B, 1002C are stacked vertically, each coupled to a respective instrument 1010A, 10106, 1010C (such strain gauge, a hall effect sensor or a potentiometer) disposed within the cavity 1006 so as to provide a profile perspective of the trench closure. It should be appreciated that rather than three drag wires as illustrated in FIG. 4, there may be only two stacked drag wires or more than three stacked drag wires. Additionally, it should be appreciated that each of the stacked the drag wires 1002 may be instrumented with a pressure transducer as described above or one of more of the stacked wires may be instrumented with a pressure transducer while other wires are coupled to an instrument 1010 disposed within the cavity 1006. Each drag wire 1002 may have a different geometry, length or diameter as compared to other drag wires 1002. The different geometries or diameters may provide a different signal response for different areas within the trench. Alternatively, instead of vertical alignment, multiple drag wires 1002A, 1002B, 1002C can be stacked horizontally (not shown), or a combination of horizontal and vertical stacks (not shown).

In another embodiment, instrument 1010A, 10106, and 1010C may send an electrical current to multiple drag wires 1002A, 1002B, and 1002C, respectively. If any of drag wires 1002A, 10026, or 1002C make contact, an electrical circuit will be formed, and instruments 1010A, 10106, and 1010C may then determine which drag wires 1002A, 1002B, and 1002C are in contact with one another. This information may be sent to monitor 300 by signal wire 1014. Knowing whether the multiple drag wires 1002A, 1002B, and 1002C are touching provides information about whether multiple drag wires 1002A, 1002B, and 1002C are sensing the same location or different locations. When contacted, multiple drag wires 1002A, 1002B, and 1002C are measuring the same location and provides another measurement to determine whether the furrow is open or closed. For example, if the furrow is open, multiple drag wires 1002A, 10026, and 1002C would fall under gravity and contact one another.

Figure 5A:
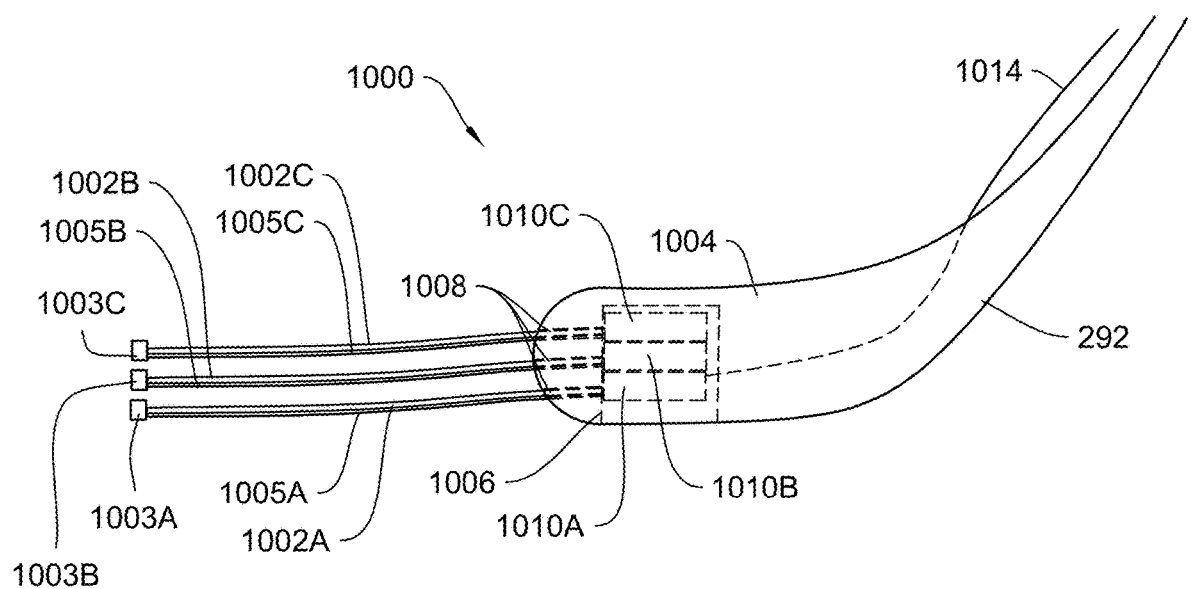
FIG. 5A illustrates an alternative embodiment to that of FIG. 5 by including conductive tips at the end of the drag wires.

In another embodiment illustrated in FIG. 5A, when multiple drag wires 1002A, 1002B, and 1002C or fluid tube 9002 is a non-conductive material, conductive tips 1003A, 1003B, and 1003C may be added to the ends of multiple drag wires 1002A, 1002B, and 1002C, respectively, at the end opposite instrument 1010A, 10106, and 1010C, respectively, or to fluid tube 9002. In such an embodiment, the conductive tips 1003A, 1003B, and 1003C are connected to instrument 1010A, 10106, and 1010C, respectively, by wires 1005A, 10056, and 1005C, respectively.

Figure 25:
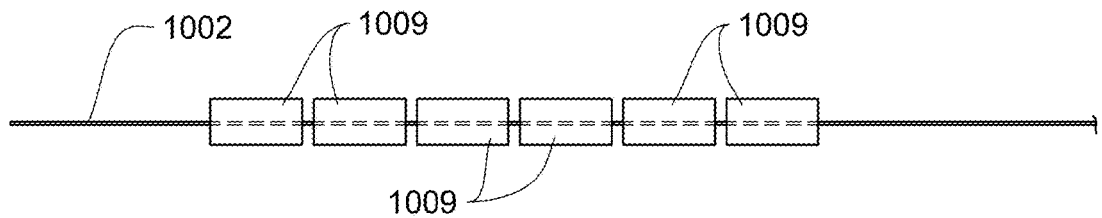
FIG. 25 shows an embodiment of a drag wire with a plurality of wear protectors disposed over the drag wire.

In another embodiment as illustrated in FIG. 25, drag wire 1002 may further include at least one wear protector 1009 disposed over drag wire 1002. Wear protector 1009 may be a single piece, or wear protector 1009 can be a plurality of pieces. Whether as a single piece or as a plurality of pieces, wear protector 1009 may cover from greater than 0 up to 100% of drag wire 1002. In certain embodiments, the percentage of coverage of drag wire 1002 extending from body of the firmer is 40 to 60%, about 50%, greater than 90%, or 95-99%. Wear protector 1009 may be made from any material that increases wear resistance compared to the material of drag wire 1002. In one embodiment, wear protector 1009 is made from tungsten carbide. Tungsten carbide can provide increase wear resistance, but tungsten carbide can be brittle. As such, in one embodiment, a wear protector 1009 made from tungsten carbide is a plurality of pieces, such as shown in FIG. 25.

Figure 12:
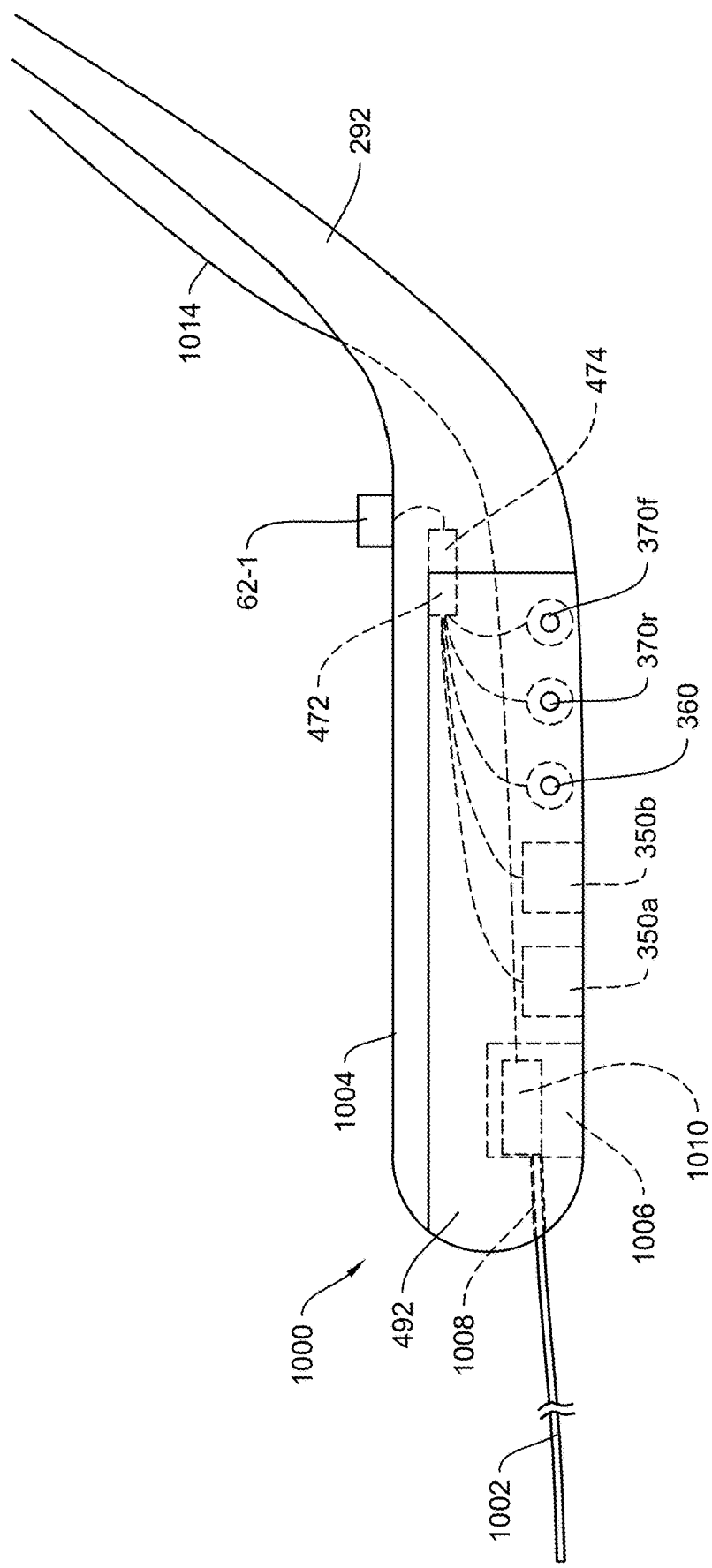
FIG. 12 is an embodiment of seed firmer adapted to function as trench closing sensor showing the drag wire coupled to an instrument disposed in the body of the seed firmer and having a plurality of firmer-mounted sensors.
Figure 26:
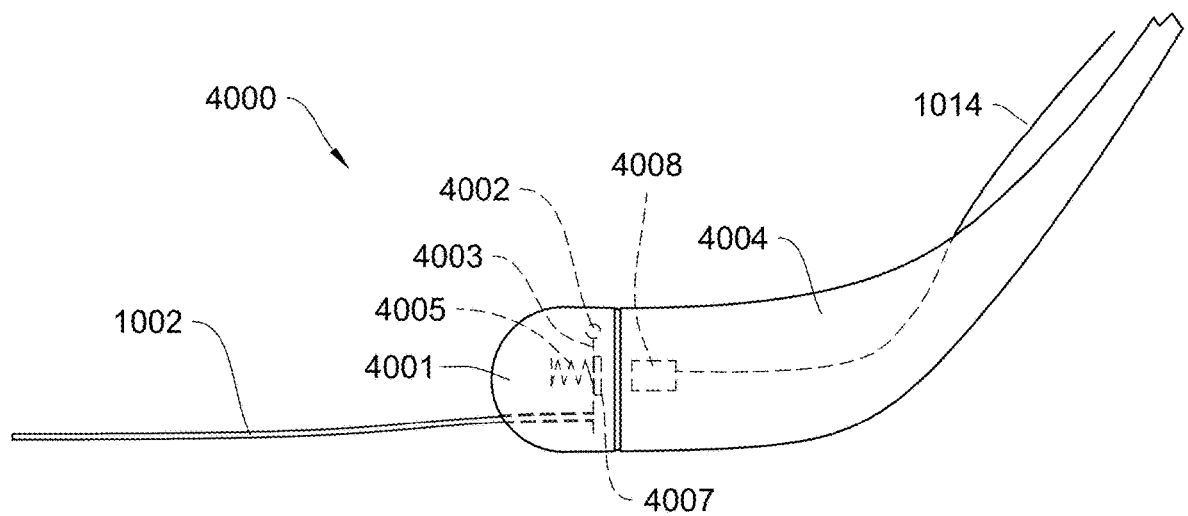
FIG. 26 is a side elevation view of an embodiment of a seed firmer adapted to function as trench closing sensor showing a detachable portion of the seed firmer with the drag wire in the detachable portion.

FIG. 26 illustrates another embodiment of a trench closing sensor 4000. In this embodiment, trench closing sensor 4000 has a first body 4004 and a second body 4001. The second body 4001 may be detachable from the first body 4004 by any suitable attachment, such as a fastener, nut and bolt, screw, and/or clip. The second body 4001 has a member 4003 (such as a plate) attached to a pivot 4002 at one end, and drag wire 1002 is disposed at the other end of 4003. The drag wire 1002 is then disposed through second body 4001 and extends rearward. Plate 4003 pivots about pivot 4002 and extends downward. A biasing element 4005 (such as a spring) biases plate 4003 forward towards the first body 4004. A stop (not shown) may be provided to prevent movement of plate 4003 too far forward. In a neutral position in one embodiment, plate 4003 is perpendicular to the ground. Disposed on plate 4003 is a transmitter 4007 (such as a magnet). Transmitter 4007 generates a signal (such as a magnetic field) that is detected by a receiver 4008 (such as a Hall Effect sensor) disposed in the first body 4004. In one embodiment, the transmitter 4007 may be disposed on plate 4003 on the side facing the first body 4004. Receiver 4008 is then in communication with monitor 300 through signal wire 1014. Receiver 4008 may first be disposed on a circuit board (not shown) and then connected to signal wire 1014, such as illustrated in FIG. 12 in which other sensors (such as reflectivity or temperature sensors) are disposed in the first body 4004 and connected to a circuit board.

As drag wire 1002 is pulled by contact with soil, plate 4003 will pivot rearward, and the distance between transmitter 4007 and receiver 4008 will increase and change the signal (magnetic field) measured by receiver 4008. When drag wire 1002 becomes worn, trench closing sensor 4000 provides for easier replacement of the drag wire 1002 by removing second body 4001 and replacing it with a new second body 4001. This saves time by not having to open the body 4004 in trench closing sensor 4000.

Figure 27A:
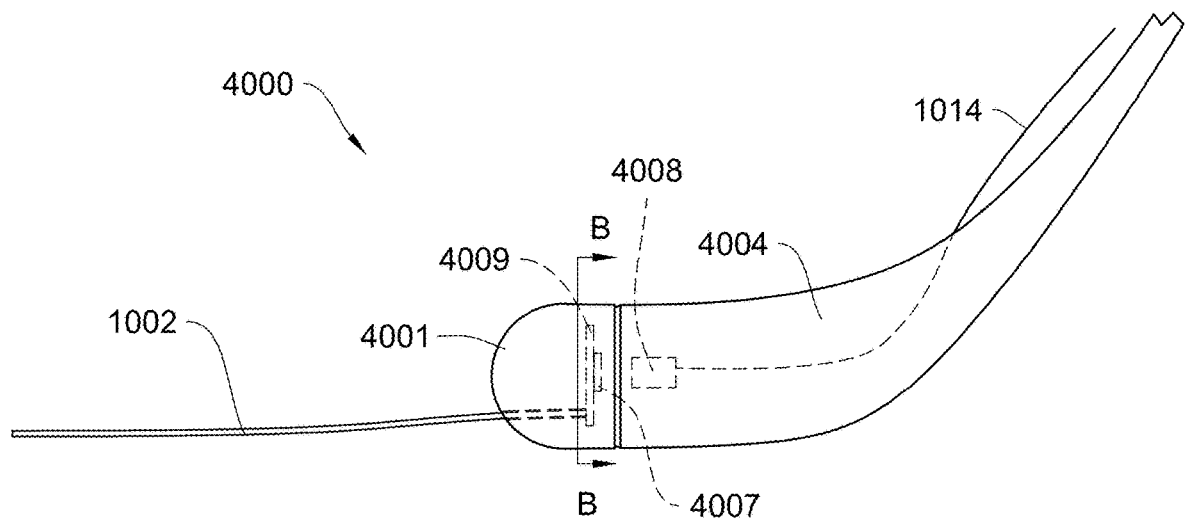
FIG. 27A is a side elevation view of another embodiment of a seed firmer adapted to function as trench closing sensor showing the drag wire in the detachable portion of the seed firmer body.
Figure 27B:
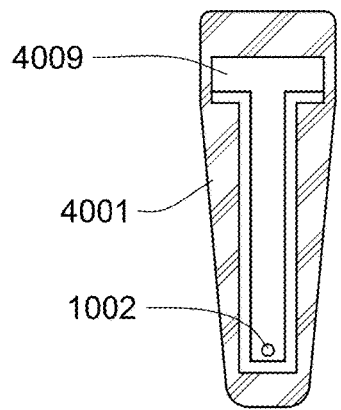
FIG. 27B is a cross-sectional view along lines B-B of FIG. 27A showing an embodiment of a plate disposed in a detachable portion of the seed firmer body.

In an alternative to the previous embodiment and illustrated in FIGS. 27A and 27B, resilient plate 4009 replaces plate 4003 and pivot 4002. Transmitter 4007 is disposed on plate 4009 as with plate 4003. In this embodiment, resilient plate 4009 deflects when drag wire 1002 pulls on plate 4009, and 4009 returns to its original position when no force is applied. As illustrated in FIG. 27B, plate 4009 may have a T shape.

Figure 28:
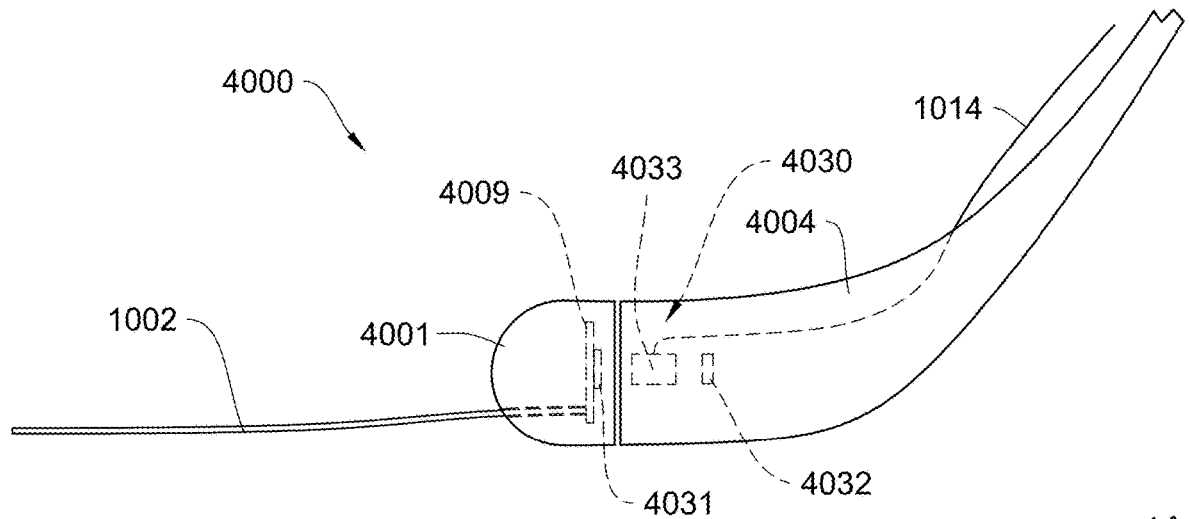
FIG. 28 is a side elevation view of another embodiment of a seed firmer adapted to function as trench closing sensor showing a Hall Effect sensor between two magnets.

In another embodiment illustrated in FIG. 28, transmitter 4007 and receiver 4008 are replaced by sensor system 4030. For illustration purposes, sensor system 4030 is shown with the embodiment of FIG. 27A. Sensor system 4030 includes a first magnet 4031, a second magnet 4032, and a Hall Effect sensor 4033. First magnet 4031 and second magnet 4032 are disposed in a body/bodies (such as 1004, 4001, 4004) so that the same poles (both N-N or S-S) are oriented towards each other. Hall Effect sensor 4033 is disposed equidistant from first magnet 4031 and second magnet 4032 so that the field measured at this middle point is zero. The benefit of having this configuration is that the full voltage range for the Hall Effect sensor 4033 is available to measure the field in the compressed space as compared to only having half of the voltage range available to read the field at a distance from to infinity. First magnet 4031 is disposed on plate 4009 or plate 4003.

While illustrated with two bodies 4001 and 4004, any of the embodiments in FIG. 26, 27A, or 28 may be used in a single body (not shown).

Figure 29:
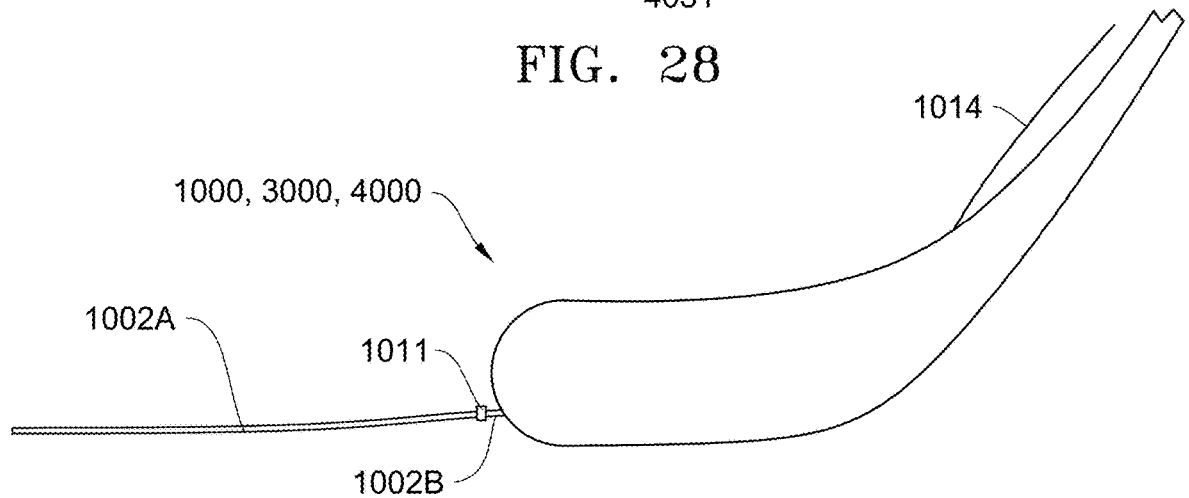
FIG. 29 is a side elevation view of a seed firmer adapted to function as trench closing sensor showing a detachable drag wire.

In another embodiment illustrated in FIG. 29, any of the drag wires 1002 described herein can be made in two parts, a drag wire base section 1002B and drag wire end 1002A, and connected at detachable connection 1011. Having the detachable drag wire end 1002A allows for replacement of the drag wire without having to open body 1004 (or body 4001).

Referring again to FIG. 8, the signals generated by the trench closing sensor 1000, 9000, 4000 may be communicated by signal wires 1014 to the monitor 300 as the actual measurement or the monitor 300 may be programmed to convert and display on the monitor screen the actual force, tension or pressure measured by the sensor 1000, 9000, 4000 in the seed trench 10 in relation to a desired force, tension or pressure range. If the desired displayed force, tension or pressure is outside the desired range, the downforce on the closing wheel 254 may be adjusted. The adjustment of the closing wheel downforce may be adjusted manually by adjusting the position of a conventional coil spring corresponding to discrete preload settings. Alternatively, if the closing wheel assembly 250 is equipped with trench closing wheel assembly actuator 256 as previously described, the operator may manually actuate the trench closing wheel assembly actuator 256 as needed to increase or decrease the amount of downforce exerted by the closing wheels 254 to keep the force, tension or pressure measured by the trench closing sensor 1000 within the desired range. Alternatively, the monitor 300 may be programmed to automatically actuate the trench closing wheel assembly actuator 256 to increase or decrease the downforce on the closing wheels 254 depending on whether the trench closing sensor 1000 detects that the force, tension or pressure on the drag wire(s) 1002 falls below or exceeds a predefined minimum and maximum threshold force, tension or pressure. In yet another embodiment, rather than adjusting the downforce on the closing wheel assembly 250 via a conventional coil spring or actuator, the angle of the closing wheels may be adjusted to increase or decrease the aggressiveness of the closing wheels. For example, as is known in the art, an actuator or mechanical adjustment (not shown) may be provided to decrease or increase the angle of the closing wheels with respect to the direction of travel or with respect to vertical thereby adjusting the amount of soil the closing wheels push into the seed trench. If a closing wheel angle actuator is provided to adjust the closing wheel angle, the operator may actuate the actuator manually or the monitor 300 may be programmed to automatically actuate the actuator to adjust the aggressiveness of the closing wheels depending on the force, tension or pressure detected by the trench closing sensor 1000, 9000, 4000.

Figure 24:
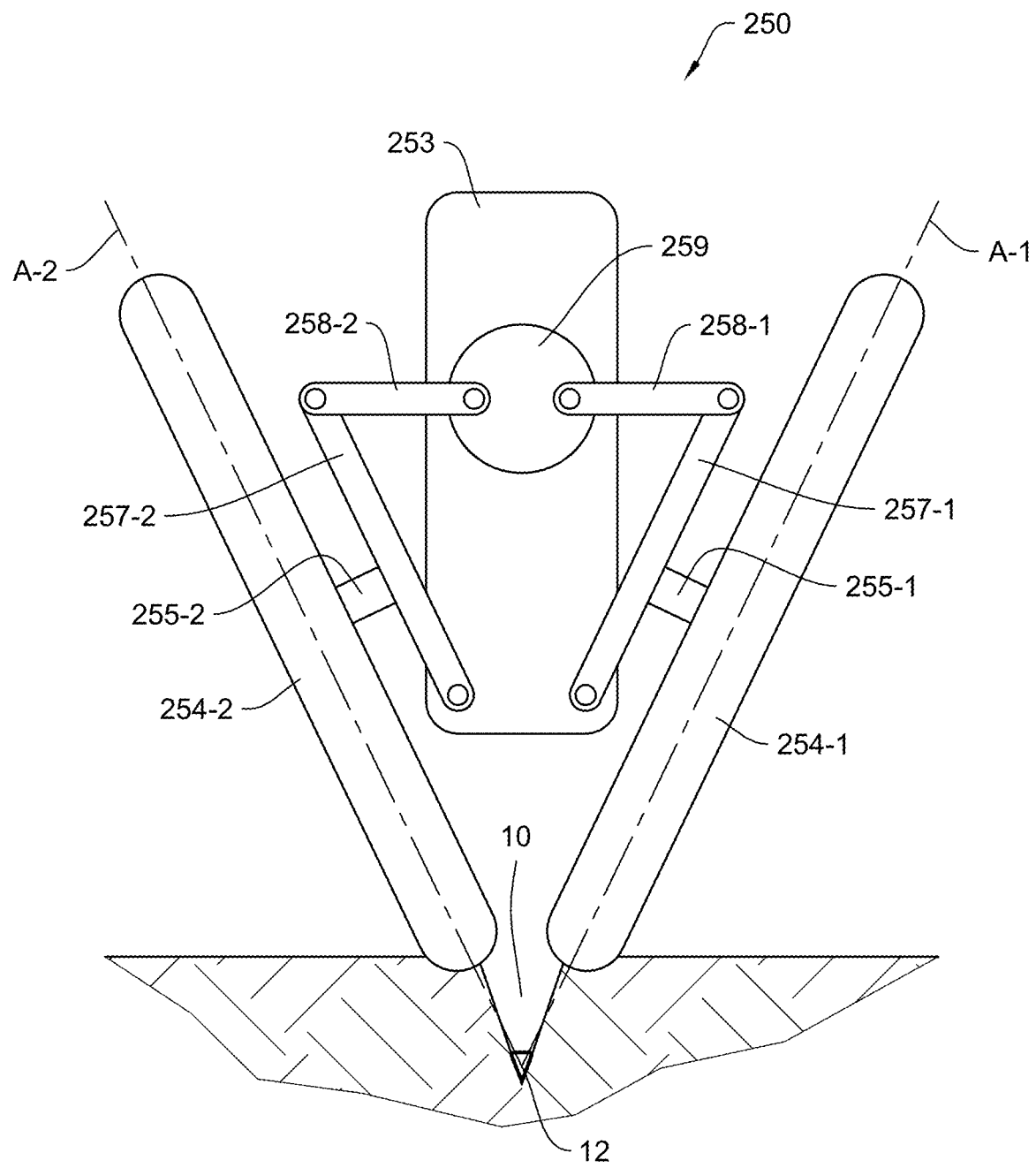
FIG. 24 is a rear view of the closing wheels looking in the direction of travel positioned over a trench having a seed.

In another embodiment illustrated in FIG. 24, the camber angle of the closing wheels can be adjusted so that axis A-1 and A-2 through the closing wheels 254-1 and 254-2 intersect the seed 12 in the trench 10. The work layer sensors described below can be used to locate the seed 12 in the trench 10. The position of the closing system 250 with respect to any of the work layer sensors is known, and closing wheels 254-1 and 254-2 may be adjusted by actuator 259 to adjust the camber angle of closing wheels 254-1 and 254-2. Alternatively, the camber angle may be adjusted to intersect the bottom of trench 10. In certain embodiments, it may be assumed that seed 12 is at the bottom of trench 10. The bottom of trench 10 may be determined by any instrument that determines the depth of trench 10. Non-limiting examples of instruments that may determine the depth of trench 10 are disclosed in CN101080968, CN201072894, DE102004011302, J P0614628, J P2069104, J P04360604, J P08168301, JP2001299010, JP2006345805, U.S. Pat. Nos. 4,413,685, 4,775,940, 5,060,205, 6,216,795, 8,909,436, US20150289438, US20160037709, WO2012102667, WO2015169323, and U.S. Provisional Application No. 62/365,585, all of which are incorporated herein by reference with respect to the disclosed distance/depth determination subject matter. The angle may then be determined by assuming that the trench is centered between closing wheels 254-1 and 254-2. In the embodiment of FIG. 24, closing system 250 includes a closing frame member 253. Closing wheels 254-1 and 254-2 are attached to axles 255-1 and 255-2, respectively. Axles 255-1 and 255-2 are connected to axle arms 257-1 and 257-2, respectively, which are pivotably connected to frame member 253 and actuator arms 258-1 and 258-2, respectively, which are pivotably connected to the actuator 259. The actuator 259 is in communication with monitor 300, wherein the actuator 259 receives signals to rotate, which causes actuator arms 258-1 and 258-2 to move closer or farther from the center of closing frame 253 to cause the angle of axle arms 257-1 and 257-2 with respect to closing frame member 253 to change, which, in turn, changes the camber angles of closing wheels 254-1 and 254-2. While shown with one actuator 259, there can be two actuators 259-1 and 259-2 with axle arm 258-1 connected to actuator 259-1 and axle arm 258-2 connected to actuator 259-2 to allow for independent adjustment of the camber angles of closing wheels 254-1 and 254-2 (not shown).

Packer Wheel Adjustment

Alternatively, or additionally, the packer wheel assembly 260 may be adjusted based on the tension, pulling force or pressure detected by the drag wire(s) 1002. The adjustment of the packer wheel downforce may be adjusted manually by adjusting the position of a conventional coil spring corresponding to discrete preload settings, or, if the packer wheel assembly 260 is equipped with an actuator 266 as previously described, the operator may manually actuate the actuator 266 or the monitor 300 may be programmed to automatically actuate the actuator 266 to increase or decrease the amount of downforce exerted on the packer wheel 264 to keep the force, tension or pressure measured by the trench closing sensor 1000, 9000, 4000 within the desired range.

Reference Sensor and Trench Closing Sensor Calibration

Figure 6:
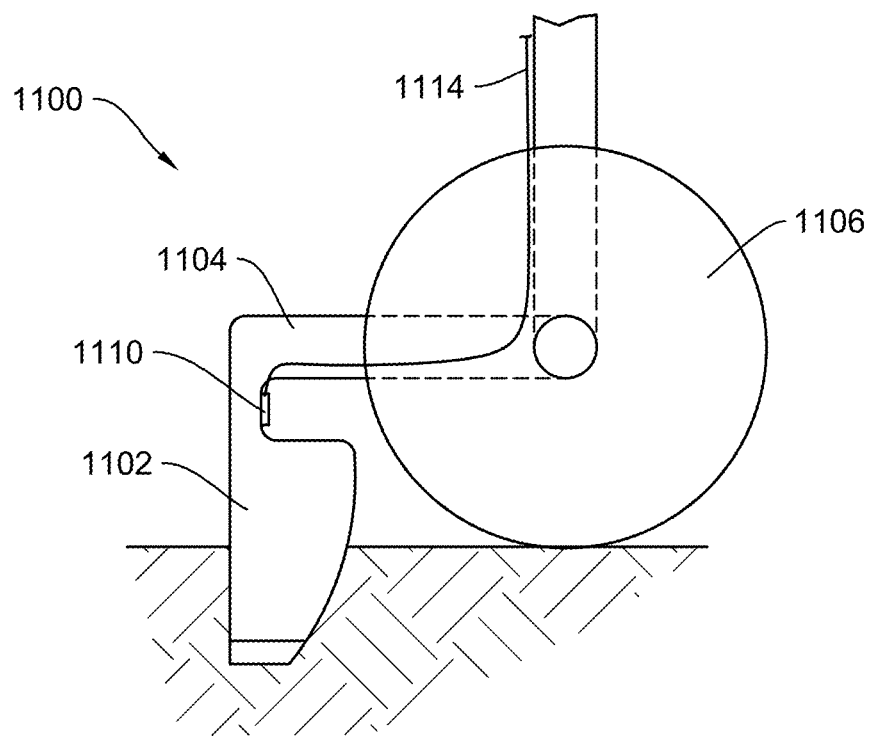
FIG. 6 is an enlarged side elevation view of an embodiment of a reference sensor.
Figure 7:
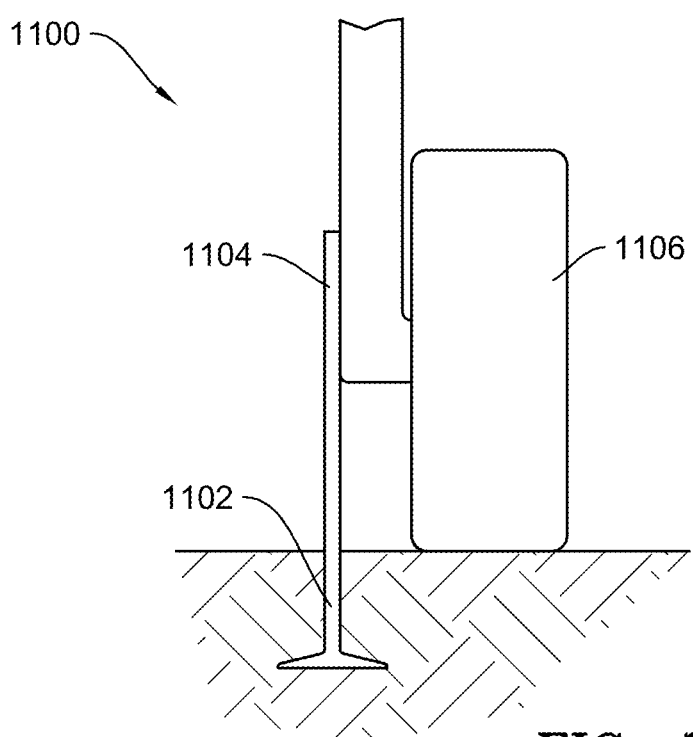
FIG. 7 is a rear elevation view of the reference sensor of FIG. 6.

A reference sensor 1100 (FIGS. 2, 6 and 7) may be provided to "calibrate" the trench closing sensor 1000, 9000, 4000 to account for conditions that may have an effect on the drag coefficient properties of the soil, including such factors as planter speed, trench depth, soil texture, soil moisture and soil density. As best illustrated in FIGS. 6 and 7, the reference sensor 1100 includes a drag member 1102 which is disposed to drag through the soil outside of the seed trench 10. The reference sensor 1100 may be disposed forward of the trench opening assembly 220 as shown in FIG. 2 or the drag member 1102 may be mounted between the row units 200 (not shown). The drag member 1102 is supported by an arm 1104 which is adjustably positionable with respect to a gauge wheel 1106 to vary the penetration depth of the drag member 1102 with respect to the soil surface. The arm 1104 is instrumented with a strain gauge 1110 to detect the strain exerted on the arm 1104 as the drag member 1102 drags through the soil. Signal wires 1114 transmit the electrical resistance change in the strain gauge 1110 to the monitor 300. The monitor 300 is programmed to correlate the electrical resistance change to detected strain in the arm 1104 which can then be correlated with the signals generated by the trench closing sensor 1000 to define the range of the force, tension or pressure that the trench closing sensor 1000 should be detecting if the seed trench is being adequately closed by the trench closing assembly 250.

In other embodiments, the reference sensor 1100 may be the penetration force of row unit 200. The penetration force be measured directly with force sensor 223, such as a strain gauge, disposed at the opener disc spindle 225 as illustrated in FIG. 2. The penetration force of row unit 200 may also be determined by subtracting the gauge wheel force measured by downforce sensor 238 from the applied force as applied by the downforce control system 214 and the mass of row unit 200.

In other embodiments, the reference sensor 1100 may be the electrical conductivity or reflectance of the soil. Suitable sensors for electrical conductivity and reflectance are described in WO2015/171908, which is incorporated herein by reference in its entirety. In one embodiment illustrated in FIG. 12, the seed firmer appurtenance 292 of FIG. 3 further contains the reflectivity sensors 350$a$ and 350$b$, electrical conductivity sensors 370$f$ and 370$r$ of seed firmer 400 shown in FIG. 4$a$ of WO2015/171908. While this embodiment shown a wireless transmitter 62-1, which is in data communication with monitor 300, the data communication to monitor 300 can be wired. Also shown in FIG. 12 (from FIG. 4A from WO2015/171908) is temperature sensor 360, removable portion 492, male coupler 472, and female coupler 474.

In another embodiment, the reference sensor 1100 may be the geospatial soil type information based on GPS location, such as the USDA SSURGO data, which may be useful when changing zones in the field. The data for each zone in the field can be the reference.

Figure 13:
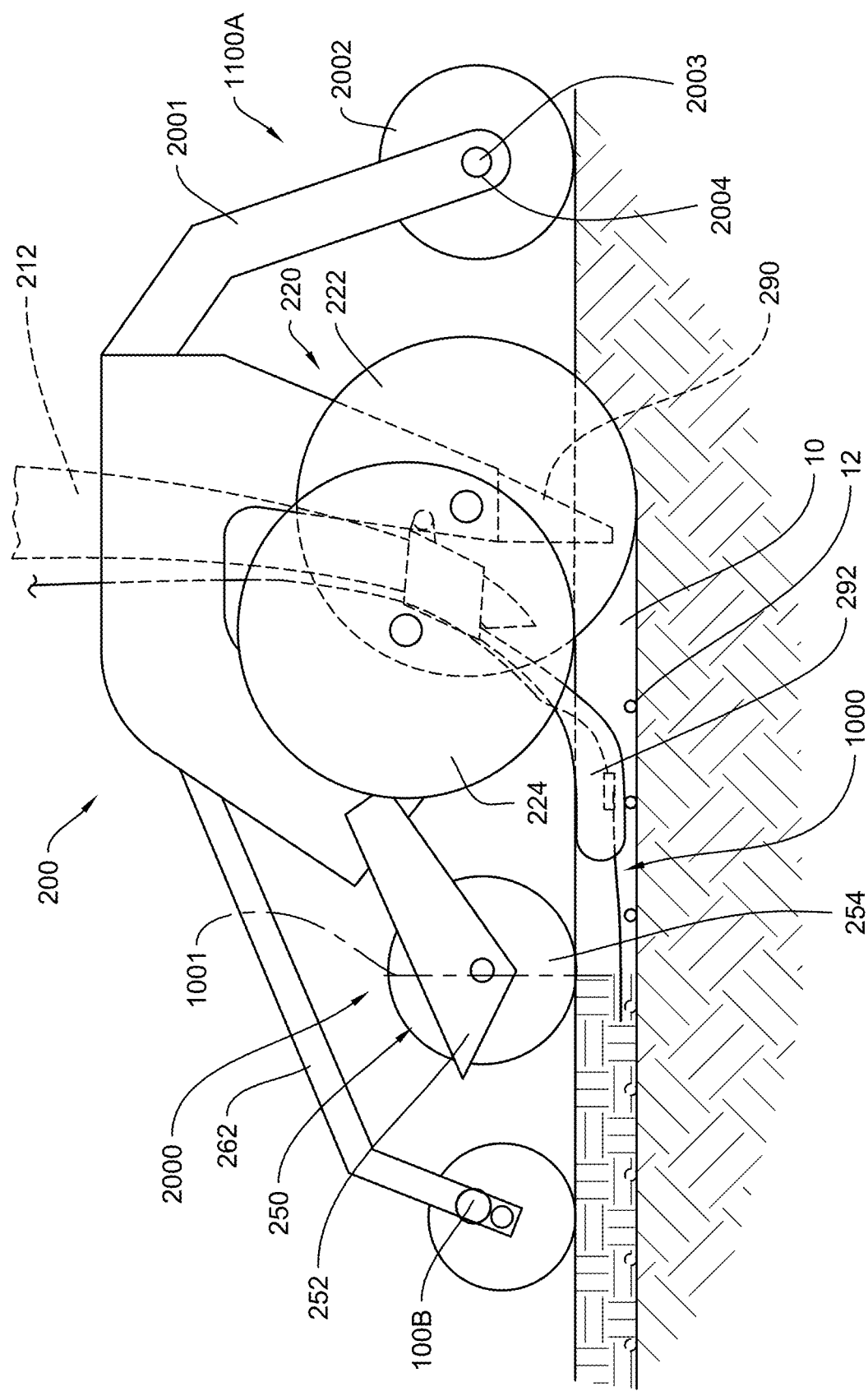
FIG. 13 illustrates an alternative reference sensor.

An alternative reference sensor 1100A, illustrated in FIG. 13, includes a coulter arm 2001 attached to row unit 200 with a coulter 2002 attached to coulter arm 2001 with axle 2003. At axle 2003, a force sensor 2004, such as downforce sensor 238, measures the force that coulter 2002 transmits to axle 2003. Force sensor 2004 is in data communication with monitor 300.

Figure 14:
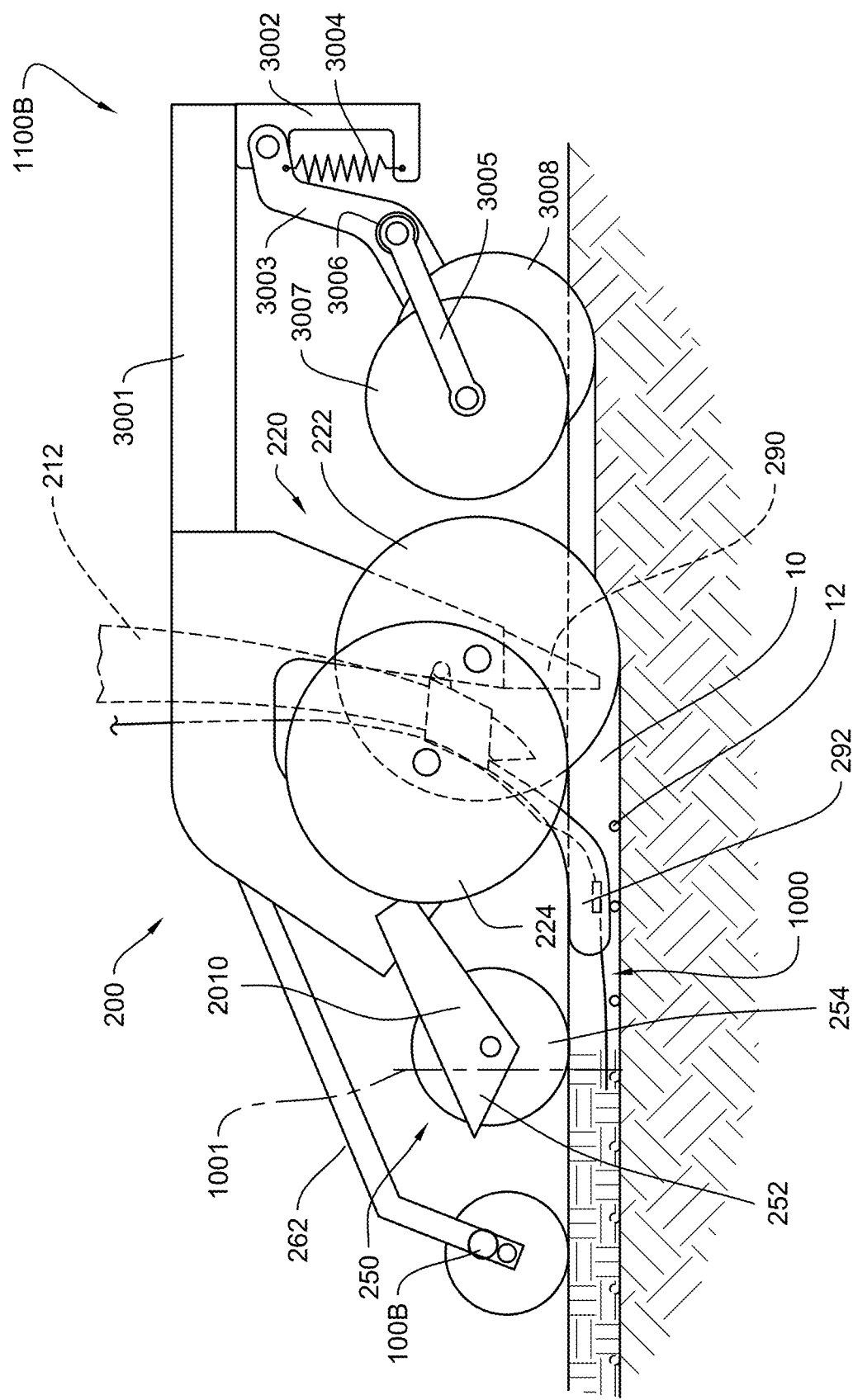
FIG. 14 illustrates an alternative reference sensor.

An alternative reference sensor 1100B, illustrated in FIG. 14, includes arm 3001 mounted to row unit 200 (or alternatively to toolbar 202), and at the opposite end of arm 3001 is bracket 3002. To bracket 3002, a coulter arm 3003 is pivotably mounted, and a force device 3004, such as a spring, is disposed to connect coulter arm 3003 to bracket 3002 to apply a fixed force to coulter arm 3003. Alternatively, the force device may be a pneumatic device, hydraulic device, an electromechanical device, or an electro-hydraulic device. A coulter 3008 is rollingly mounted to coulter arm 3003. A gauge wheel arm 3005 is pivotably connected to coulter arm 3003, and a gauge wheel 3007 is rollingly mounted to gauge wheel arm 3005. An angle sensor 3006 is disposed at the pivoting connection between gauge wheel arm 3005 and coulter arm 3003. Examples of angle sensor 3006 include, but are not limited to, a rotary potentiometer or Hall-effect sensor. Angle sensor 3006 is in data communication with monitor 300. In this embodiment, force device 3004 applies a known force to coulter 3008. As the hardness of the soil changes, gauge wheel arm 3005 will rotate, and angle sensor 3006 measures the amount of rotation.

Another reference sensor that may be used in conjunction with trench closing sensor 1000, 9000, 4000 is the speed of row unit 200. As the speed of travel changes, the force, tension or pressure measured will directly change with the change in speed. The speed of row unit 200 may be determined by any suitable device, such as a speedometer on the tractor (tractor wheel speed), GPS distance change over time, or ground speed radar. Any of these devices may be in data communication with monitor 300.

Operator Feedback to Control Closing Wheel Assembly

FIG. 9 is a schematic illustration of a system 500 which employs the trench closing sensors 1000, 9000, 4000 and reference sensors 1100 to provide operator feedback and to control the closing wheel assembly 250 and packer wheel assembly 260 of the planter row unit 200. At steps 510 and 512, the reference sensor 1100 detects the strain (via the strain gauge 1110) exerted on the arm 1104. At step 512, the strain exerted on the arm 1104 is correlated to define the range of force, tension or pressure that should be detecting if the seed trench is being adequately closed by the trench closing assembly 250. At step 514 the trench closing sensor 1000, 9000, 4000 detects the force, tension or pressure exerted by the soil on the drag wire(s) 1002. At step 516 the force, tension or pressure exerted by the soil on the drag wire(s) 1002 of the trench closing sensor 1000, 9000, 4000 may be displayed to the operator on the monitor 300 in the cab of the tractor in relation to the correlated range of the force, tension or pressure that the trench closing sensor 1000, 9000, 4000 should be detecting if the seed trench is being adequately closed by the trench closing assembly 250. At step 518, control decisions are made based on the comparison of the characterized range with the force, tension or pressure detected by that the trench closing sensor 1000, 9000, 4000. At step 520, the closing wheel assembly 250 or the packer wheel assembly 260 may be controlled by the monitor 300 generating signals to actuate one or more of the corresponding actuators 256, 266 and/or at step 522, corresponding recommendations may be displayed to the operator on the monitor display.

Other Trench Sensor Systems

FIG. 10 shows an embodiment of a trench sensor system 2000. The trench sensor system 2000 has one or both of a trench sensor 2010 and ground sensor 2020. Trench sensor 2010 is disposed on closing system 250 after the opening assembly 220 in a direction of travel to sense the distance to the bottom of seed trench 10. Ground sensor 2020 is disposed on row unit 200 after trench sensor 2010 in a direction of travel to sense the distance to soil surface 1. Both trench sensor 2010 and ground sensor 2020 are at a fixed distance to the bottom of closing wheels 254, and both are in communication with monitor 300. The depth ($H_G$) of closing wheels 254 in the soil can be determined by subtracting a distance measured by ground sensor 2020 from the distance of ground sensor 2020 to the bottom of closing wheels 254. The distance ($H_F$) of closing wheels 254 above the bottom of seed trench 10 can be determined by subtracting the distance of trench sensor 2010 to the bottom of closing wheels 254 from a distance measured by trench sensor 2010. One or both of these measurements may also be used in combination with the measurements of the trench closing sensor 1000, 9000, 4000 to determine closing effectiveness. Trench sensor 2010 and ground sensor 2020 may each independently be an ultrasonic sensor, radar, or a laser.

Figure 11:
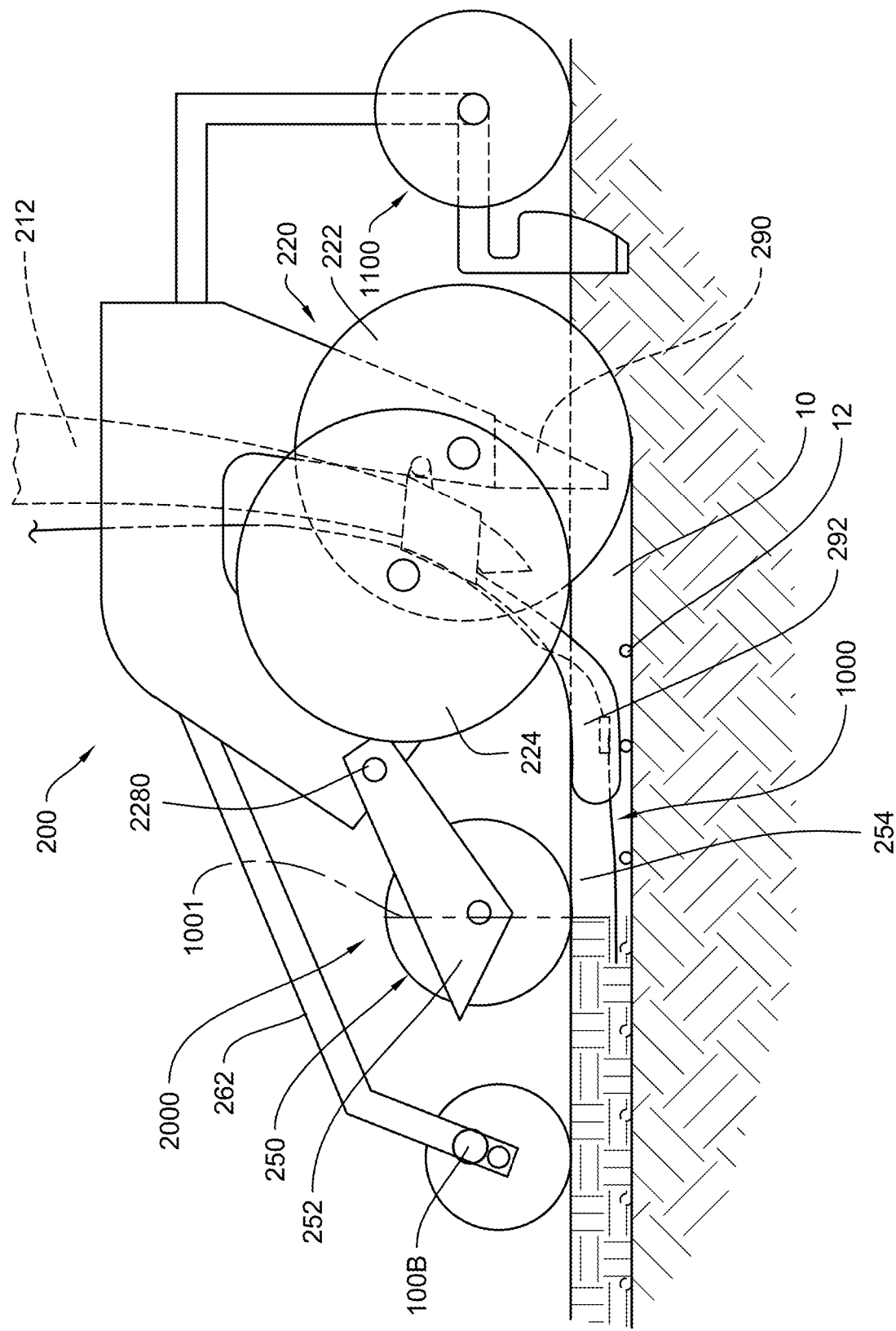
FIG. 11 illustrates an embodiment of a trench closing sensor and an angular sensor disposed on a closing system.

In another embodiment as illustrated in FIG. 11, an angle sensor 2280 can be disposed at the connection of closing wheel arm 252 and frame 204, and angle sensor 2280 is in communication with monitor 300. The angle sensor 2280 can be the same as the pivot arm angle sensor 280 in WO2014/066650. The angular output of angle sensor 2280 can be combined with the measurements of the trench closing sensor 1000, 9000, 4000 to determine closing effectiveness of the seed trench. Examples of angle sensor 2280 include, but are not limited to, rotary potentiometer and Hall-effect sensor.

Work Layer Imaging

Referring to FIG. 2, work layer sensors 100, such as disclosed in PCT Application No. PCT/US2016/031201, which is incorporated herein in its entirety by reference may be disposed on row unit 200 to generate a signal or image representative of the soil densities or other soil characteristics throughout a soil region of interest, hereinafter referred to as the "work layer" 104. Work layer sensors 100 may determine the effectiveness of the closing of the trench to identify if there are any void spaces in the closed trench. The work layer sensors may be used in conjunction with the trench closing sensor 1000, 9000, 4000.

Figure 15:
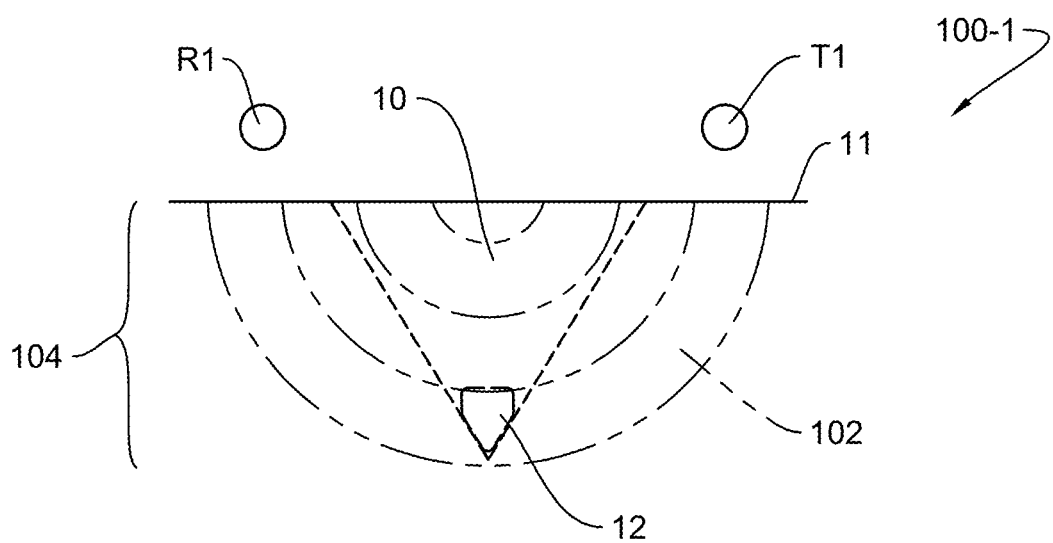
FIG. 15 schematically illustrates one embodiment of a work layer sensor, in elevation view, disposed in relation a seed trench.
Figure 17:
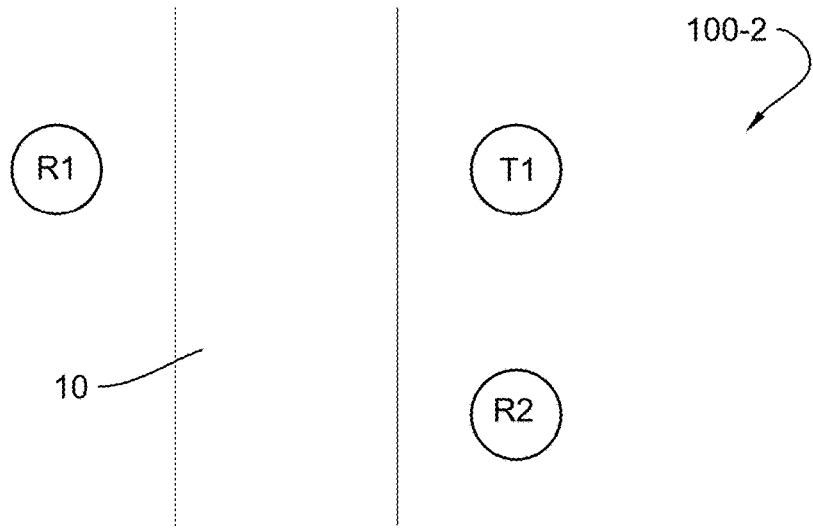
FIG. 17 schematically illustrates another embodiment of a work layer sensor, in plan view, disposed in relation to a seed trench.
Figure 19:
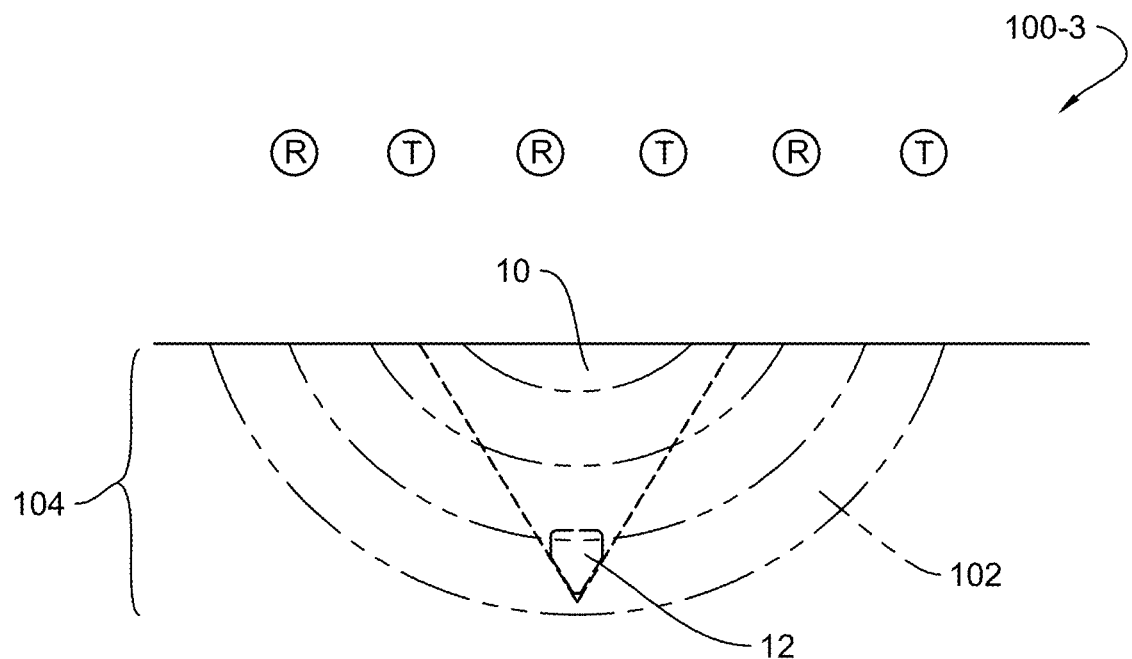
FIG. 19 schematically illustrates another embodiment of a work layer sensor, in elevation view, disposed in relation to a seed trench.

FIGS. 15, 17 and 19 schematically illustrate alternative embodiments of a work layer sensor 100. The representative image or signal generated by the work layer sensor 100 is hereinafter referred to as the "work layer image" 110. In one particular application discussed later, the work layer sensors 100 may be mounted to a planter row unit 200 (FIG. 1) for generating a work layer image 110 of the seed trench as the planter traverses the field. The work layer image 110 may be displayed on a monitor 300 visible to an operator within the cab of a tractor and the planter may be equipped with various actuators for controlling the planter based on the characteristics of the work layer 104 as determined from the work layer image 110.

The work layer sensor 100 for generating the work layer image 110 may comprise a ground penetrating radar system, an ultrasound system, an audible range sound system, an electrical current system or any other suitable system for generating an electromagnetic field 102 through the work layer 104 to produce the work layer image 110. It should be understood that the depth and width of the work layer 104 may vary depending on the agricultural implement and operation being performed.

FIG. 15 is a schematic illustration of one embodiment of a work layer sensor 100-1 disposed in relation to a seed trench 10 formed in the soil 11 by a planter, wherein the seed trench 10 comprises the soil region of interest or work layer 104. In this embodiment, the work layer sensor 100-1 comprises a transmitter (T1) disposed on one side of the seed trench 10 and a receiver (R1) disposed on the other side of the seed trench 10 to produce the electromagnetic field 102 through the seed trench to generate the work layer image 110.

In some embodiments, the work layer sensor 100 may comprise a ground-penetration radar subsurface inspection system such as any of the following commercially available systems: (1) the StructureScan™ Mini HR available from GSSI in Nashua, New Hampshire; (2) the 3d-Radar GeoScope™ Mk IV coupled to a 3d-Radar VX-Series and/or DX-Series multi-channel antenna, all available from 3d-Radar AS in Trondheim, Norway; or (3) the MALA Imaging Radar Array System available from MALA Geoscience in Mala, Sweden. In such embodiments, the commercially available system may be mounted to the planter or other implement, or may be mounted to a cart which moves with the implement; in either case the system is preferably disposed to capture an image of a work layer in the area of interest (e.g., the seed trench). In some embodiments, the work layer image 110 may be generated from the signal outputs of the work layer sensor 100 using commercially available software such as GPR-SLICE (e.g., version 7.0) available from GeoHiRes International Ltd. located in Borken, Germany.

Figure 16A:
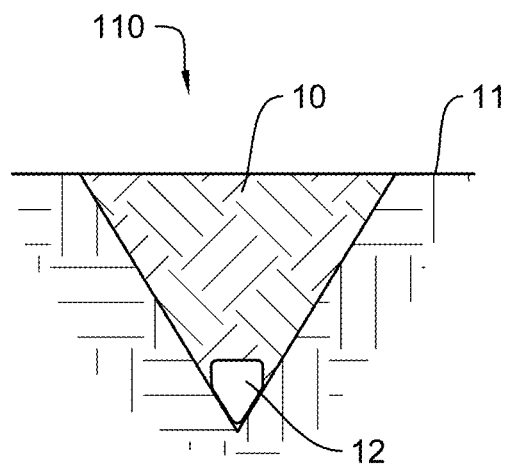
FIGS. 16A-16C are representative examples of work layer images generated by the work layer sensor of FIG. 15.
Figure 16B:
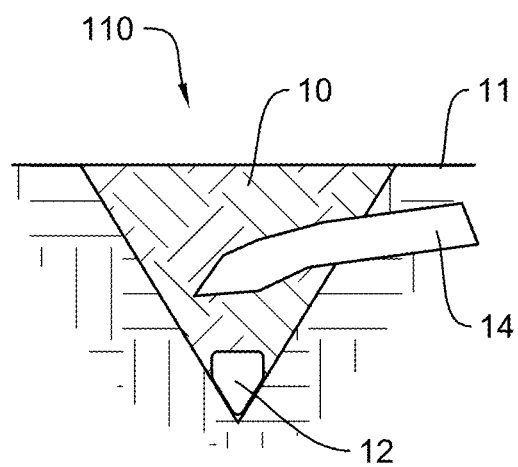
Figure 16C:
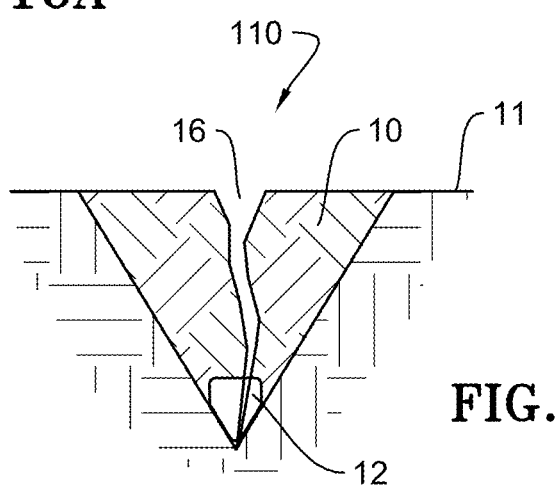

FIGS. 16A-16C are intended to be representative examples of work layer images 110 generated by the work layer sensor 100-1 of FIG. 15 showing various characteristics of the seed trench 10, including, for example, the trench depth, the trench shape, depth of seed 12, the seed depth relative to the trench depth, crop residue 14 in the trench, and the void spaces 16 within the trench. As described in more detail later, the work layer images 110 may be used to determine other characteristics of the work layer 104, including, for example, the seed-to-soil contact, percentage of trench closed, percentage of upper half of trench closed, percentage of lower half of trench closed, moisture of the soil, etc.

Figure 18A:
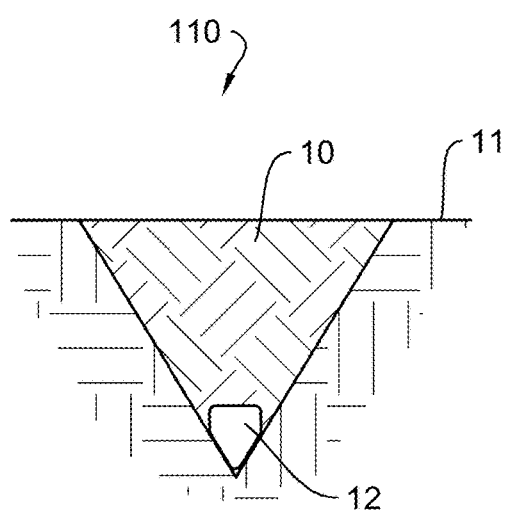
FIG. 18A-18B are representative examples of work layer images generated by the work layer sensor of FIG. 17.
Figure 18B:
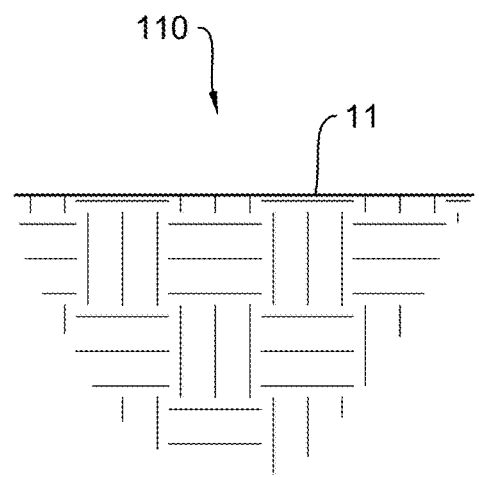

FIG. 17 schematically illustrates, in plan view, another embodiment of a work layer sensor 100-2 disposed with respect to a seed trench 10. In this embodiment, a transmitter (T1) is disposed on one side of the seed trench 10, a first receiver (R1) is disposed on the other side of the seed trench 10, and a second receiver (R2) is disposed adjacent and rearward of the transmitter (T1). FIG. 18A is a representative illustration of the work layer image 110 generated through the trench between the transmitter (T1) and the first receiver (R1)) and FIG. 18B is a representative illustration of the work layer image 110 generated between the transmitter (T1) and the second receiver (R2) providing an image of the undisturbed soil adjacent to the seed trench.

FIG. 19 is an elevation view schematically illustrating another work layer sensor embodiment 100-3 disposed with respect to a seed trench 10. In this embodiment, the work layer sensor 100-3 comprises a plurality of transmitter and receiver pairs disposed above and transverse to the seed trench 10.

Figure 20:
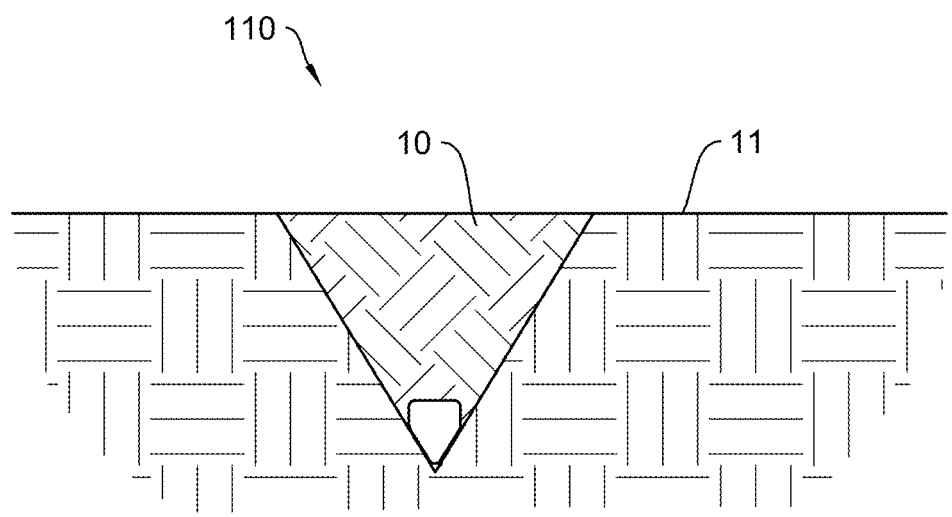
FIG. 20 is a representative example of a work layer image generated by the work sensor of FIG. 19.

FIG. 20 is a representative illustration of the work layer image 110 generated by the work layer sensor 100-3 of FIG. 5 which provides a view not only of the seed trench but also a portion of the soil adjacent to each side of the seed trench.

For each of the work layer sensor embodiments 100-1, 100-2, 100-3, the frequency of operation of the work layer sensors 100 and the vertical position of the transmitters (T) and receivers (R) above the soil and the spacing between the transmitters (T) and receivers (R) are selected to minimize signal to noise ratio while also capturing the desired depth and width of the soil region of interest (the work layer 104) for which the work layer image 110 is generated.

Work Layer Imaging for Planter Applications

FIG. 1 illustrates one example of a particular application of the work layer sensors 100 disposed on a row unit 200 of an agricultural planter. The row unit 200 includes a work layer sensor 100A disposed on a forward end of the row unit 200 and a work layer sensor 100B disposed rearward end of the row unit 200. The forward and rearward work layer sensors 100A, 100B may comprise any of the embodiments of the work layer sensors 100-1, 100-2, 100-3 previously described.

The forward work layer sensor 100A is disposed to generate a reference work layer image (hereinafter a "reference layer image") 110A of the soil prior to the soil being disturbed by the planter, whereas the rearward work layer sensor 1008 generates the work layer image 1108, which in this example, is the image of the closed seed trench 10 in which the seed has been deposited and covered with soil. For the reasons explained later, it is desirable to obtain both a reference image 110A and the work layer image 1108 for analysis of the soil characteristics through the work layer 104.

It should be appreciated that the forward and rearward work layer sensors 100A, 1006 referenced in FIG. 1 may employ any of the embodiments 100-1, 100-2 or 100-3 previously described. However, it should be appreciated that if the embodiments 100-2 or 100-3 are employed, the forward work layer sensor 100A may be eliminated because the embodiments 100-2 and 100-3 are configured to generate the work layer images 110 of undisturbed soil adjacent to the seed trench 10 which could serve as the reference layer image 110A.

It should be appreciated that rather than positioning the work layer sensors 100 as shown in FIG. 1, the work layer sensors may be positioned after the row cleaner assembly 270 and before the trench opening assembly 220 or in one or more other locations between the trench opening discs 222 and the closing wheels 254 or the packing wheel 264 depending on the soil region or characteristics of interest.

Planter Control and Operator Feedback Using Work Layer Imaging

Figure 21:
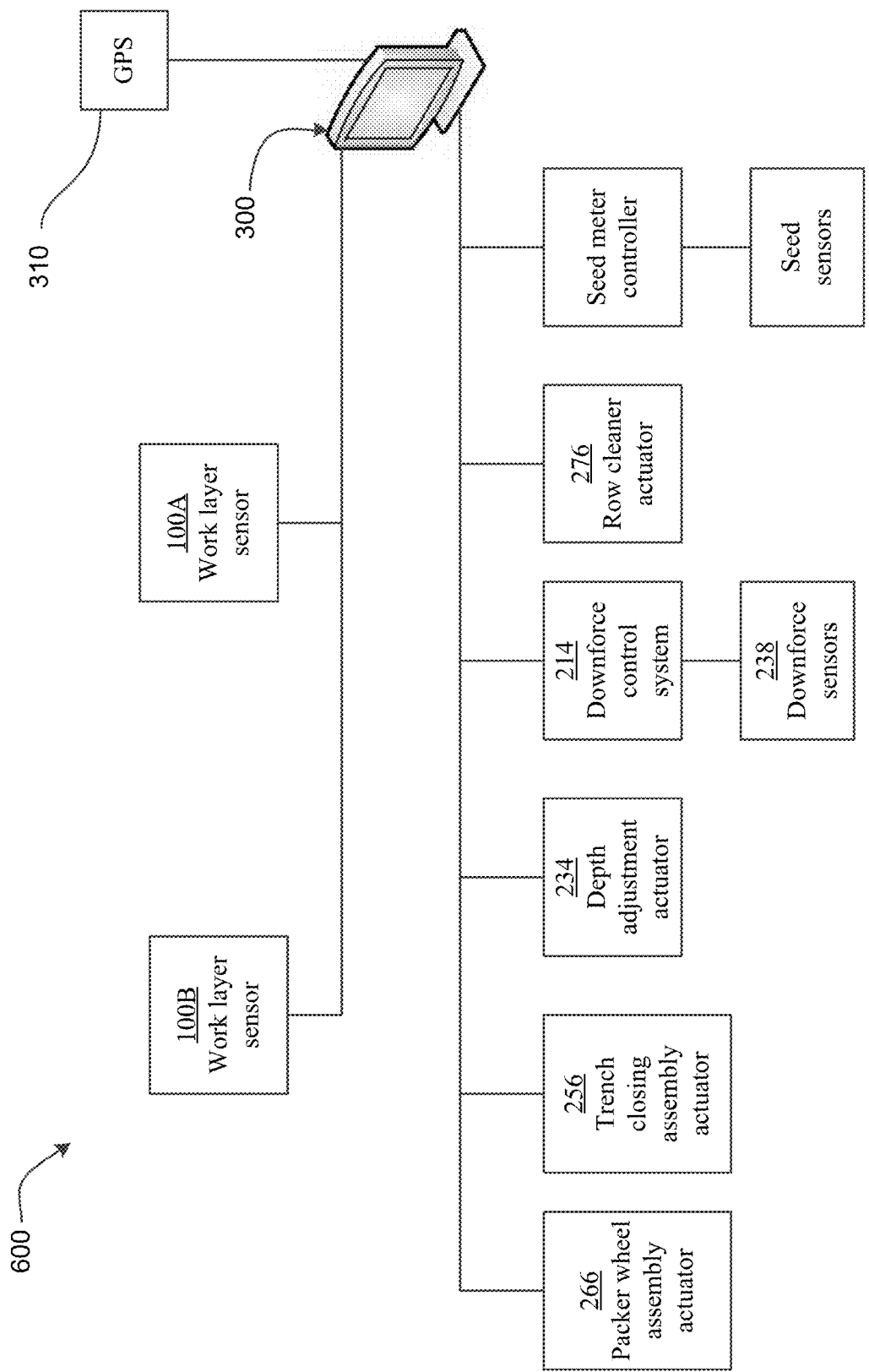
FIG. 21 illustrates an embodiment of a work layer implement monitoring, control and operator feedback system.

FIG. 21 is a schematic illustration of a system 600 which employs work layer sensors 100 to provide operator feedback and to control the planter row unit 200. Work layer sensors 100A, 1006 are disposed to generate a reference layer image 110A of undisturbed soil and a work layer image 1106 of the closed seed trench (i.e., after seed is deposited, covered with soil by the closing wheel assembly 250 and the soil packed with the packing wheel assembly 260). As previously described, the work layer sensors 100A, 1006 may be separate work layer sensors disposed forward and rearward of the row unit 200 as illustrated in FIG. 7, or the work layer sensors 100A, 100B may comprise a single work layer sensor with transmitters (T) and receivers (R) disposed to generate both a reference layer image 110A and a work layer image 1106.

The work layer image 1106 may be communicated and displayed to the operator on a monitor 300 comprising a display, a controller and user interface such as a graphical user interface (GUI), within the cab of the tractor.

The monitor 300 may be in signal communication with a GPS unit 310, the row cleaner actuator 276, the downforce control system 214, the depth adjustment actuator 234, the trench closing assembly actuator 256 and the packer wheel assembly actuator 266 to enable operational control of the planter based on the characteristics of the work layer image 1106.

For example, if the work layer image 1106 indicates that residue in the seed trench 10 is above a predetermined threshold (as explained below), a signal is generated by the monitor 300 to actuate the row cleaner actuator 276 to increase row cleaner downforce. As another example, if the seed depth is less than a predetermined threshold (as explained below), a signal is generated by the monitor 300 to actuate the downforce control system 214 to increase the downforce and/or to actuate the depth adjustment actuator 234 to adjust the gauge wheels 234 relative to the opening discs 232 to increase the trench depth. Likewise if the seed depth is greater than a predetermined threshold, a signal is generated by the monitor 300 to actuate the downforce control system 214 to decrease the downforce and/or to actuate the depth adjustment actuator 234 to decrease the trench depth. As another example, if the upper portion of the trench has more than a threshold level of void space (as explained below), a signal is generated by the monitor 300 to actuate the trench closing wheel assembly actuator 256 to increase the downforce on the closing wheels 254. As another example, if the lower portion of the trench has more than a threshold level of void space (as explained below), a signal is generated by the monitor 300 to actuate the packer wheel assembly actuator 266 to increase the downforce on the packer wheel 264.

In still other examples, the work layer image 1106 may identify and/or analyze (e.g., determine depth, area, volume, density or other qualities or quantities of) subterranean features of interest such as tile lines, large rocks, or compaction layers resulting from tillage and other field traffic. Such subterranean features may be displayed to the user on the monitor 300 and/or identified by the monitor 300 using an empirical correlation between image properties and a set of subterranean features expected to be encountered in the field. In one such example, the area traversed by the gauge wheels (or other wheels) of the planter (or tractor or other implement or vehicle) may be analyzed to determine a depth and/or soil density of a compaction layer beneath the wheels. In some such examples, the area of the work layer image may be divided into subregions for analysis based on anticipated subterranean features in such sub-regions (e.g., the area traversed by the gauge wheels may be analyzed for compaction).

In other examples, the monitor 300 may estimate a soil property (e.g., soil moisture, organic matter, or electrical conductivity, water table level) based on image properties of the work layer image 1106 and display the soil property to the user as a numerical (e.g., average or current) value or a spatial map of the soil property at geo-referenced locations in the field associated with each soil property measurement (e.g., by correlating measurements with concurrent geo-referenced locations reported the GPS unit 310).

Alternatively or additionally, the monitor 300 could be programmed to display operational recommendations based on the characteristics of the work layer image 1106. For example, if the work layer image 1106 identifies that the seed 12 is irregularly spaced in the trench 10 or if the seed 12 is not being uniformly deposited in the base of the trench, or if the spacing of the seed 12 in the trench does not match the anticipated spacing of the seed based on the signals generated by the seed sensor or speed of the seed meter, such irregular spacing, nonuniform positioning or other inconsistencies with anticipated spacing may be due to excess speed causing seed bounce within the trench or excess vertical acceleration of the row unit. As such, the monitor 300 may be programmed to recommend decreasing the planting speed or to suggest increasing downforce (if not automatically controlled as previously described) to reduce vertical acceleration of the planter row units. Likewise to the extent the other actuators 276, 214, 234, 256, 266 are not integrated with the monitor controller, the monitor may be programmed to display recommendations to the operator to make manual or remote adjustments as previously described based on the characteristics of the work layer image 1106.

Figure 22:
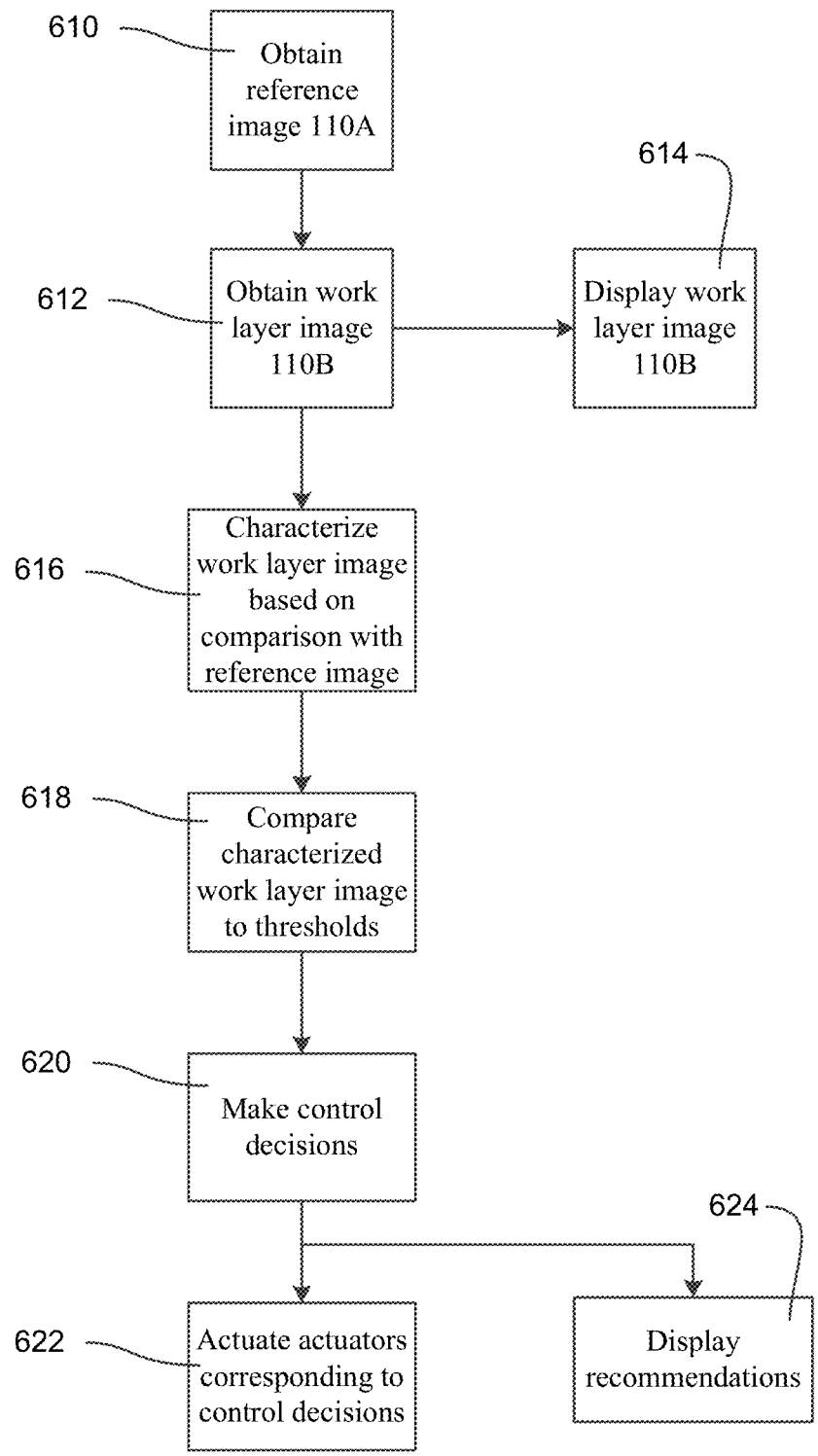
FIG. 22 is a chart showing a process for work layer implement monitoring, control and operator feedback.

FIG. 22 illustrates the process steps for controlling the planter and providing operator feedback. At steps 610 and 612, the reference image 110A and work layer image 1106 is generated by the work image sensor(s) 100. At step 614, the work layer image 1106 may be displayed to the operator on the monitor 300 in the cab of the tractor. At step 616, the reference layer image 110A is compared with the work layer image 1106 to characterize the work layer image. At step 618, the characterized work layer image 1106 is compared to predetermined thresholds. At step 620, control decisions are made based on the comparison of the characterized work layer image 1106 with the predetermined thresholds. At step 622, the planter components may be controlled by the monitor 300 generating signals to actuate one or more of the corresponding actuators 276, 214, 234, 256, 266 and/or at step 624, corresponding recommendations may be displayed to the operator on the monitor display.

To characterize the work layer image 1106 at step 616, the monitor 300 compares one or more characteristics (e.g., density) of the reference image 110A with the same characteristics of the work layer image 1106. In some embodiments, a characterized image may be generated comprising only portions of the work layer image differing from the reference image by at least a threshold value. The characterized image may then be used to identify and define features of the work layer image 1106, such as the trench shape, the trench depth, residue in the trench, seeds and seed placement within the trench, void spaces within the trench, and density differences of the soil within the trench.

For example, to determine the seed depth, the seed is identified or identifiable from the work layer image 110B by determining regions within the work layer image having a size or shape corresponding to a seed and having a density range empirically corresponding to seed.

Once a region is identified as a seed, the vertical position of the seed with respect to the soil surface is readily measurable or determined.

As another example, the amount of residue in the trench can be determined by (a) defining the area of the trench cross-section (based on soil density differences between the reference image 110A and the work layer image 110B); (b) by identifying the regions within the trench having a density range empirically corresponding to residue; (c) totaling the area of the regions corresponding to residue; and (d) dividing the residue area by the trench cross-sectional area.

Various embodiments of the invention have been described above for purposes of illustrating the details thereof and to enable one of ordinary skill in the art to make and use the invention. The details and features of the disclosed embodiments are not intended to be limiting, as many variations and modifications will be readily apparent to those of skill in the art.

The invention claimed is:

1. A row planting unit closing system, comprising:
 a first stage closing unit adapted to be attached to a row planting unit and comprising:
  a first stage frame; and
  a set of at least one row closing wheel having a closing angle orientation non-perpendicular relative to the ground; and
  wherein the first stage frame is attached at a first end to the row planting unit, the first stage frame comprising a linkage mechanism for setting a camber angle of the set of at least one row closing wheel relative to the first stage frame.

2. The row planting unit closing system of claim 1, wherein the linkage mechanism comprises at least one lever secured to a row closing wheel hub adapted to provide the camber angle of the set of at least one row closing wheel.

3. The row planting unit closing system of claim 2, further comprising:
 wherein repositioning of the at least one lever of the linkage mechanism results in re-orientation of the set of at least one row closing wheel relative to the first stage frame to effect a change in the camber angle.

4. The row planting unit closing system of claim 1, wherein the set of at least one row closing wheel comprises a first and second row closing wheel, the first and second row closing wheels being configured to provide a V-shape closing angle orientation relative to the ground.

5. The row planting unit closing system of claim 4, wherein the first and second row closing wheels operate on opposite sides of a furrow to cause a closing action on the furrow by compression of soil on the opposite sides of the furrow.

6. The row planting unit closing system of claim 1, wherein both the camber angle and the closing angle orientation are fixed.

7. The row planting unit closing system of claim 1, wherein one or both of the camber angle and the closing angle are adjustable.

8. The row planting unit closing system of claim 1, wherein the first stage frame further comprises a set of suspension mounting points for securing and supporting a first stage frame biasing mechanism.

9. The row planting unit closing system of claim 1, further comprising wherein the first stage frame is pivotally mounted to the row planting unit at the first end and is disposed beneath the row planting unit.

10. The row planting unit closing system of claim 1 further comprising a second stage closing unit comprising a second stage frame and a second stage closing wheel.

11. A row planting unit closing system, comprising:
 a first stage closing unit adapted to be attached to a row planting unit and comprising:
  a first stage closing wheel frame secured to a row planting unit; and a set of at least one row closing wheel having a closing angle orientation non-perpendicular relative to the ground; and wherein the first stage closing wheel frame is attached at a first end to the row planting unit, the first closing wheel stage frame comprising a linkage mechanism for setting a camber angle of the set of at least one row closing wheel relative to the first stage closing wheel frame.

* * * * *